United States Patent
Obara

(10) Patent No.: US 10,282,188 B2
(45) Date of Patent: May 7, 2019

(54) APPARATUS AND METHOD FOR CREATING MODIFICATION APPLICATION INFORMATION

(71) Applicant: FUJITSU LIMITED, Kawasaki-shi, Kanagawa (JP)

(72) Inventor: Yoshito Obara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 15/131,439

(22) Filed: Apr. 18, 2016

(65) Prior Publication Data

US 2016/0321058 A1   Nov. 3, 2016

(30) Foreign Application Priority Data

Apr. 30, 2015   (JP) .................................. 2015-092888

(51) Int. Cl.
  *G06F 8/61*   (2018.01)
  *G06F 8/65*   (2018.01)
  *G06F 11/14*   (2006.01)

(52) U.S. Cl.
  CPC .................. *G06F 8/65* (2013.01); *G06F 8/62* (2013.01); *G06F 11/1458* (2013.01); *G06F 2201/84* (2013.01)

(58) Field of Classification Search
  CPC .......... G06F 8/62; G06F 8/65; G06F 11/1458; G06F 2201/84
  USPC .................................................. 717/168–178
  See application file for complete search history.

(56) References Cited

U.S. PATENT DOCUMENTS

| | | | |
|---|---|---|---|
| 5,835,778 A | 11/1998 | Yoshihara | |
| 6,668,289 B2* | 12/2003 | Cheng | G06F 8/62 709/200 |
| 7,039,827 B2* | 5/2006 | Meyer | G06F 3/0605 714/4.11 |
| 7,370,233 B1* | 5/2008 | Sobel | G06F 11/1458 714/15 |
| 7,757,080 B1* | 7/2010 | Schilder | G06F 21/6209 713/162 |
| 2003/0163493 A1* | 8/2003 | Burns | G06F 11/1469 |
| 2006/0085685 A1* | 4/2006 | Cheston | G06F 8/60 714/38.13 |

(Continued)

FOREIGN PATENT DOCUMENTS

| JP | 7-182178 | 7/1995 |
|---|---|---|
| JP | 2003-296132 | 10/2003 |
| WO | WO 2012/127587 A1 | 9/2012 |

*Primary Examiner* — Andrew M. Lyons
(74) *Attorney, Agent, or Firm* — Staas & Halsey LLP

(57) ABSTRACT

An apparatus for creating modification application information includes a processor. The processor is configured to create, on basis of a modification history of software executed in a system, first information on first modifications presumed to be currently applied to the software. The modification history includes information on second modifications applied to the software and dissolution of the second modifications. The processor is configured to restore the software to a state before the first modifications are applied. The processor is configured to re-apply the first modifications to the restored software on basis of the first information. The processor is configured to determine whether the first information is valid on basis of information on a progress or results of the restoration of the software and the re-application of the first modifications.

15 Claims, 29 Drawing Sheets

(56) References Cited

U.S. PATENT DOCUMENTS

| | | | |
|---|---|---|---|
| 2006/0259587 A1* | 11/2006 | Ackerman | G06Q 20/3678 709/219 |
| 2012/0054728 A1* | 3/2012 | Rohde | G06F 8/65 717/168 |
| 2012/0101997 A1* | 4/2012 | Zwilling | G06F 11/1451 707/649 |
| 2012/0323857 A1* | 12/2012 | Brehm | G06F 8/61 707/674 |
| 2014/0019809 A1* | 1/2014 | Nagaoka | G06F 11/3604 714/38.1 |
| 2015/0113520 A1* | 4/2015 | Kotani | G06F 8/654 717/172 |
| 2015/0193224 A1* | 7/2015 | Ziat | G06F 8/65 717/172 |

* cited by examiner

| ID | MANIPULATION | RESULT | DETAILED INFORMATION | PRODUCT NAME |
|---|---|---|---|---|
| 1 | APPLICATION OF MODIFICATION | SUCCESSFUL | T001WP-01 | PRODUCT B |
| 2 | DISSOLUTION OF MODIFICATION | UNSUCCESSFUL | T001WP-01 | PRODUCT B |
| 3 | APPLICATION OF MODIFICATION | SUCCESSFUL | T002WP-01 | PRODUCT A |
| 4 | APPLICATION OF MODIFICATION | SUCCESSFUL | T003WP-01 | PRODUCT C |
| 5 | APPLICATION OF MODIFICATION | SUCCESSFUL | T004WP-01 | PRODUCT D |
| 6 | DISSOLUTION OF MODIFICATION | SUCCESSFUL | T004WP-01 | PRODUCT D |
| 7 | APPLICATION OF MODIFICATION | SUCCESSFUL | T002WP-02 | PRODUCT A |

FIG.15

| ID | MANIPULATION | RESULT | DETAILED INFORMATION | PRODUCT NAME |
|---|---|---|---|---|
| 1 | APPLICATION OF MODIFICATION | SUCCESSFUL | T001WP-01 | PRODUCT B |
| 2 | DISSOLUTION OF MODIFICATION | UNSUCCESSFUL | T001WP-01 | PRODUCT B |
| 3 | APPLICATION OF MODIFICATION | SUCCESSFUL | T002WP-01 | PRODUCT A |
| 4 | APPLICATION OF MODIFICATION | SUCCESSFUL | T003WP-01 | PRODUCT C |
| 5 | APPLICATION OF MODIFICATION | SUCCESSFUL | T004WP-01 | PRODUCT D |
| 7 | APPLICATION OF MODIFICATION | SUCCESSFUL | T002WP-02 | PRODUCT A |

FIG. 18
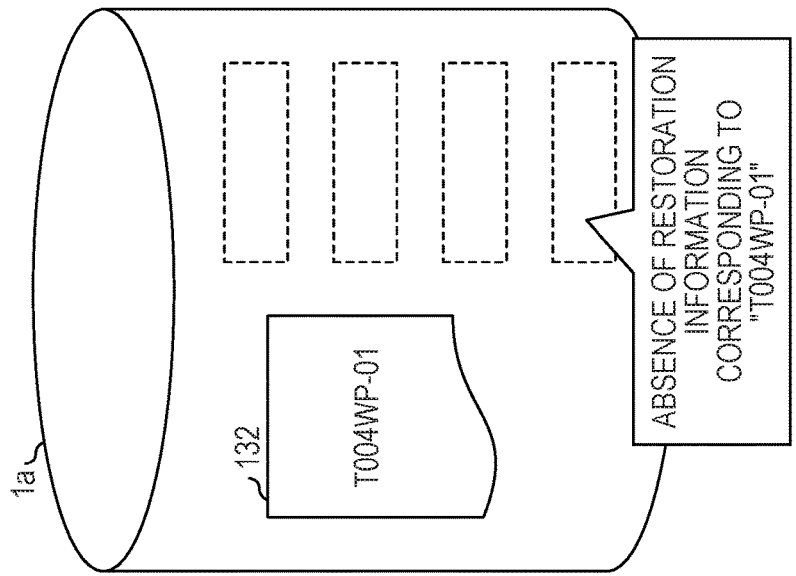
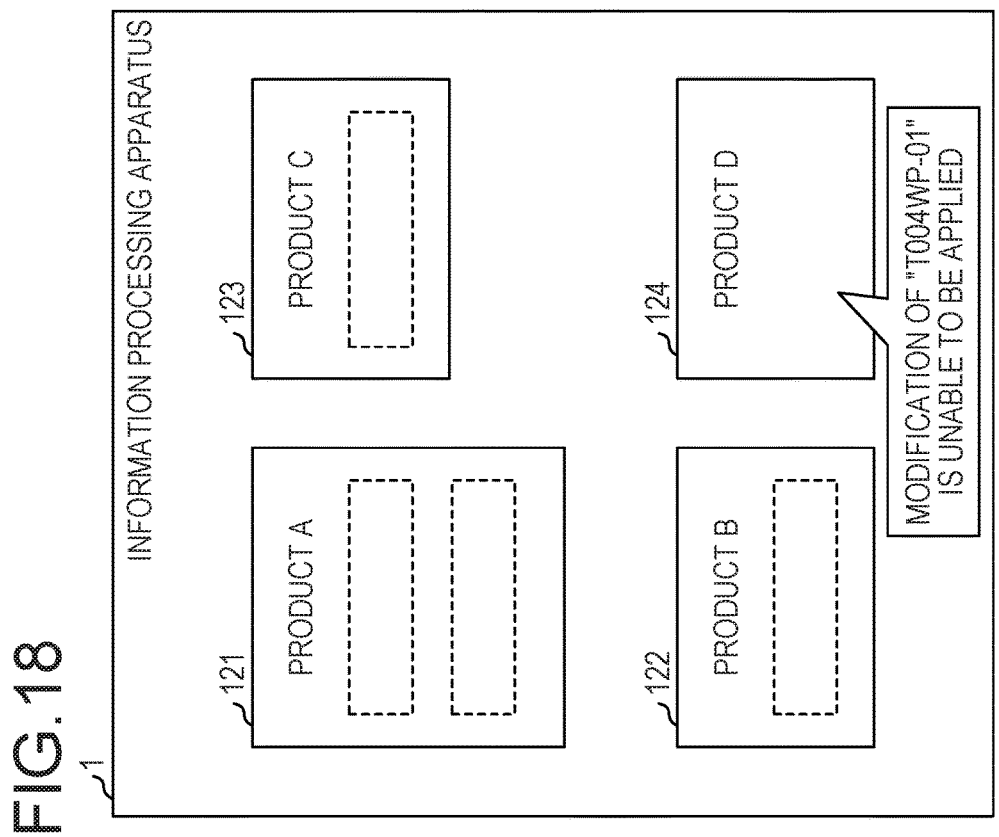

FIG.19

| ID | MANIPULATION | RESULT | DETAILED INFORMATION | PRODUCT NAME |
|---|---|---|---|---|
| 1 | APPLICATION OF MODIFICATION | SUCCESSFUL | T001WP-01 | PRODUCT B |
| 2 | DISSOLUTION OF MODIFICATION | UNSUCCESSFUL | T001WP-01 | PRODUCT B |
| 3 | APPLICATION OF MODIFICATION | SUCCESSFUL | T002WP-01 | PRODUCT A |
| 5 | APPLICATION OF MODIFICATION | SUCCESSFUL | T004WP-01 | PRODUCT D |
| 6 | DISSOLUTION OF MODIFICATION | SUCCESSFUL | T004WP-01 | PRODUCT D |
| 7 | APPLICATION OF MODIFICATION | SUCCESSFUL | T002WP-02 | PRODUCT A |

| ID | MANIPULATION | RESULT | DETAILED INFORMATION | PRODUCT NAME |
|---|---|---|---|---|
| 1 | APPLICATION OF MODIFICATION | SUCCESSFUL | T001WP-01 | PRODUCT B |
| 2 | DISSOLUTION OF MODIFICATION | UNSUCCESSFUL | T001WP-01 | PRODUCT B |
| 3 | APPLICATION OF MODIFICATION | SUCCESSFUL | T002WP-01 | PRODUCT A |
| 4 | APPLICATION OF MODIFICATION | SUCCESSFUL | T003WP-01 | PRODUCT C |
| 5 | APPLICATION OF MODIFICATION | SUCCESSFUL | T004WP-01 | PRODUCT D |
| 6 | DISSOLUTION OF MODIFICATION | SUCCESSFUL | T004WP-01 | PRODUCT D |

133

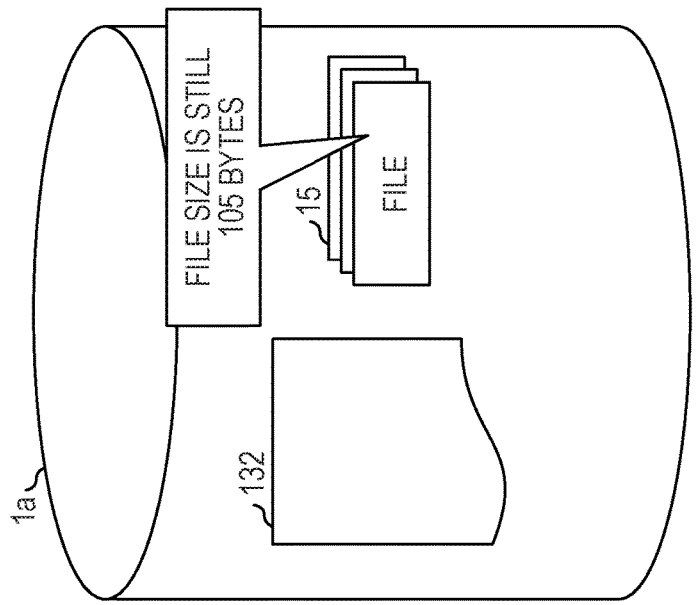
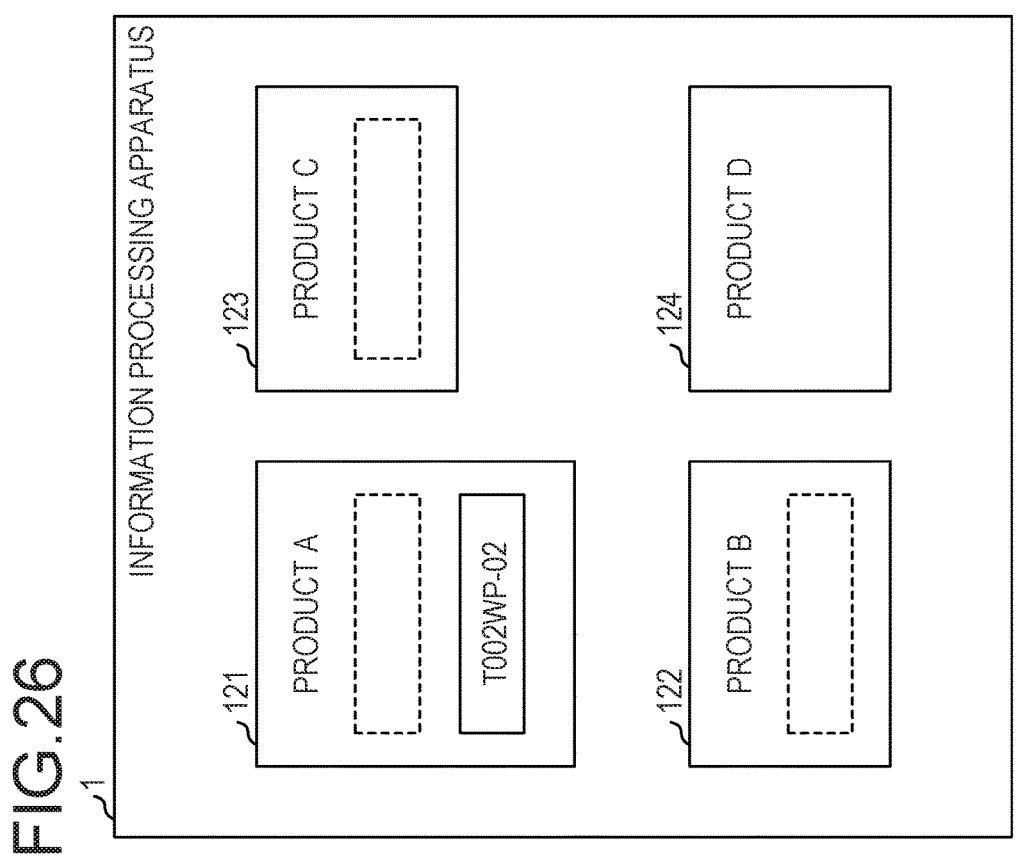

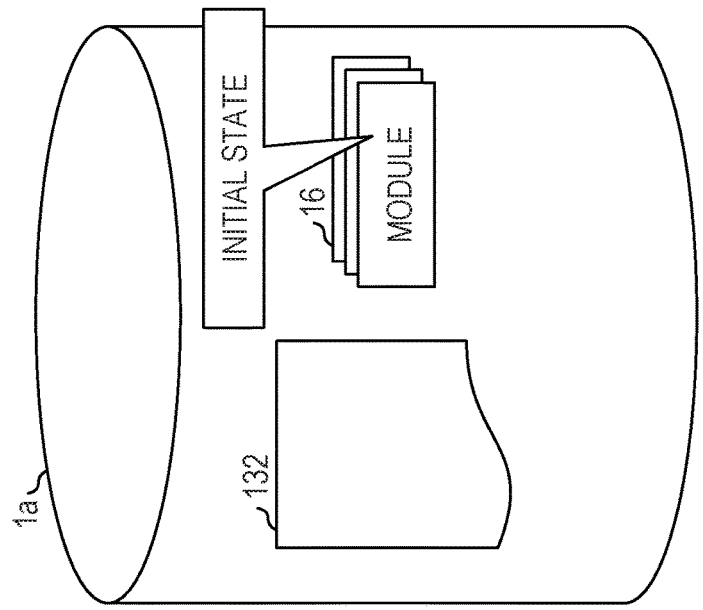
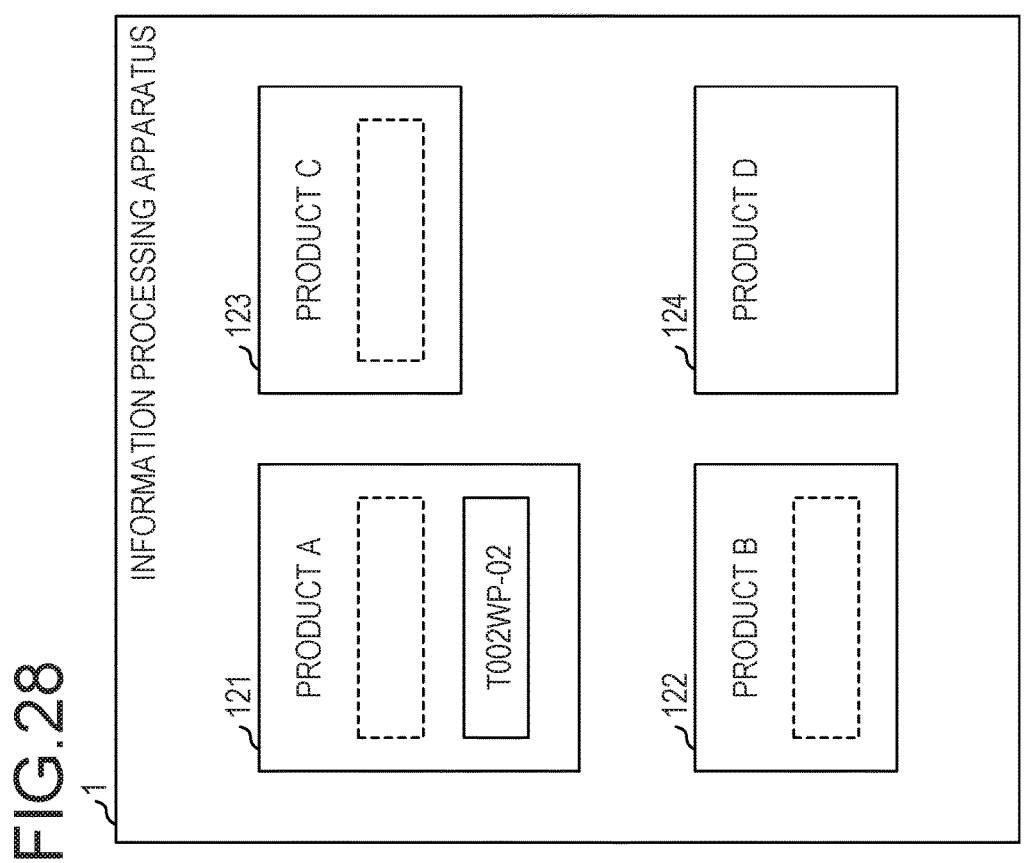
FIG.28

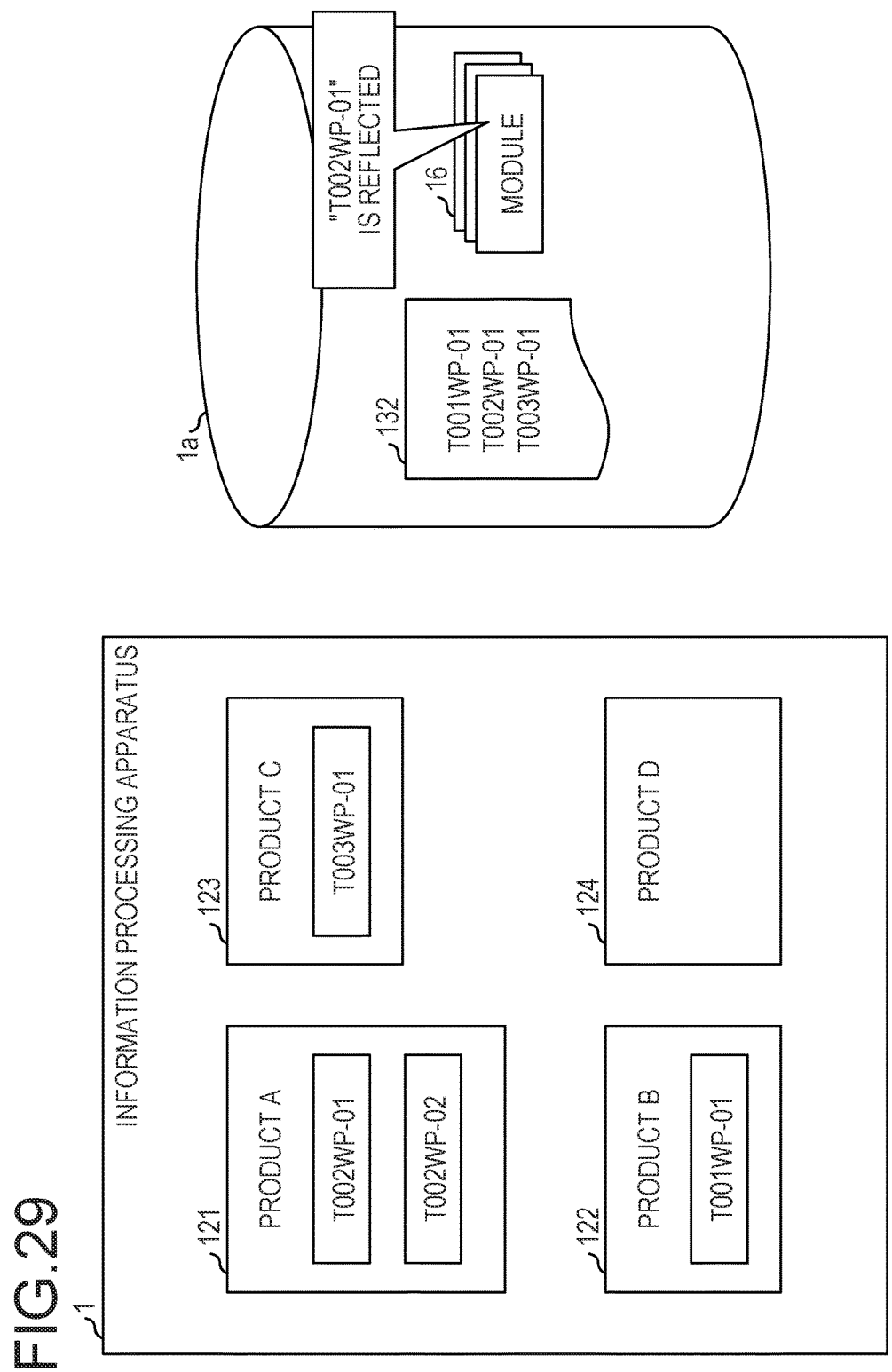

APPARATUS AND METHOD FOR CREATING MODIFICATION APPLICATION INFORMATION

CROSS-REFERENCE TO RELATED APPLICATION

This application is based upon and claims the benefit of priority from the prior Japanese Patent Application No. 2015-092888, filed on Apr. 30, 2015, the entire contents of which are incorporated herein by reference.

FIELD

The embodiment discussed herein is related to an apparatus and a method for modification application information creating.

BACKGROUND

An operator who operates and manages a business system creates information (hereinafter referred to as "modification application information") on a status of modifications applied to software executed as a part of the business system. Then, the operator checks the current status of software by referring to the modification application information as necessary.

When the operator restores modified software to a state before the modifications are applied, that is, dissolves the modifications applied to the software, there is a case where processing associated with the restoration has been unsuccessfully completed. In this case, the business system is in a state where software (restored software) for which the restoration has been completed and software (unrestored software) for which the restoration has not yet been completed are mixed.

In this case, the operator may grasp the current status of the software, for example, by comparing the contents of the modification application information with information (hereinafter referred to as "version number information") on version numbers of the modifications actually applied to the software. In addition, the operator may identify factors which have inhibited the restoration of software, for example, by comparing the contents of the modification application information with the version number information of modifications applied to the software.

Related techniques are disclosed in, for example, Japanese Laid-Open Patent Publication No. 07-182178, International Publication Pamphlet No. WO 2012/127587, and Japanese Laid-Open Patent Publication No. 2003-296132.

The above-described business system has a possibility that the modification application information corresponding to the software being executed in the business system is deleted due to a failure of the operating system (OS) or the like. Specifically, when the existence of software under execution is not recognized, the OS determines that the software is uninstalled and accordingly deletes the modification application information.

In this case, for example, on the basis of a modification history in which information on modifications applied to software and dissolution of the modifications is accumulated, the operator restores (re-creates) the modification application information. However, in some cases, such a modification history is not created on the assumption that the modification history is used to create the modification application information and may lack reliability (validity). Therefore, there are some cases where the operator is unable to make a determination on whether the modification application information created from the modification history is to be used in the business system.

There are some cases where the operator re-installs the software executed in the business system and applies modifications, which has been applied before the re-installation, to the re-installed software. Accordingly, the operator may re-create the modification application information with high validity along with the modification application to the re-installed software. However, such software re-installation may require a huge amount of work time and labor. Therefore, it is desirable for the operator not to perform a task such as re-installation as much as possible.

SUMMARY

According to an aspect of the present invention, provided is an apparatus for creating modification application information. The apparatus includes a processor. The processor is configured to create, on basis of a modification history of software executed in a system, first information on first modifications presumed to be currently applied to the software. The modification history includes information on second modifications applied to the software and dissolution of the second modifications. The processor is configured to restore the software to a state before the first modifications are applied. The processor is configured to re-apply the first modifications to the restored software on basis of the first information. The processor is configured to determine whether the first information is valid on basis of information on a progress or results of the restoration of the software and the re-application of the first modifications.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of modification history;

FIG. 15 is a diagram illustrating an example of a modification history;

FIG. 18 is a diagram illustrating a second example of S3 and S4;

FIG. 19 is a diagram illustrating an example of a modification history;

FIG. 23 is a diagram illustrating an example of a modification history;

FIG. 26 is a diagram illustrating a fourth example of S3 and S4;

FIG. 28 is a diagram illustrating a first example of S5; and

FIG. 29 is a diagram illustrating a first example of S5.

DESCRIPTION OF EMBODIMENT

Hereinafter, embodiment of the present disclosure will be described with reference to the drawings.

Figure 1:
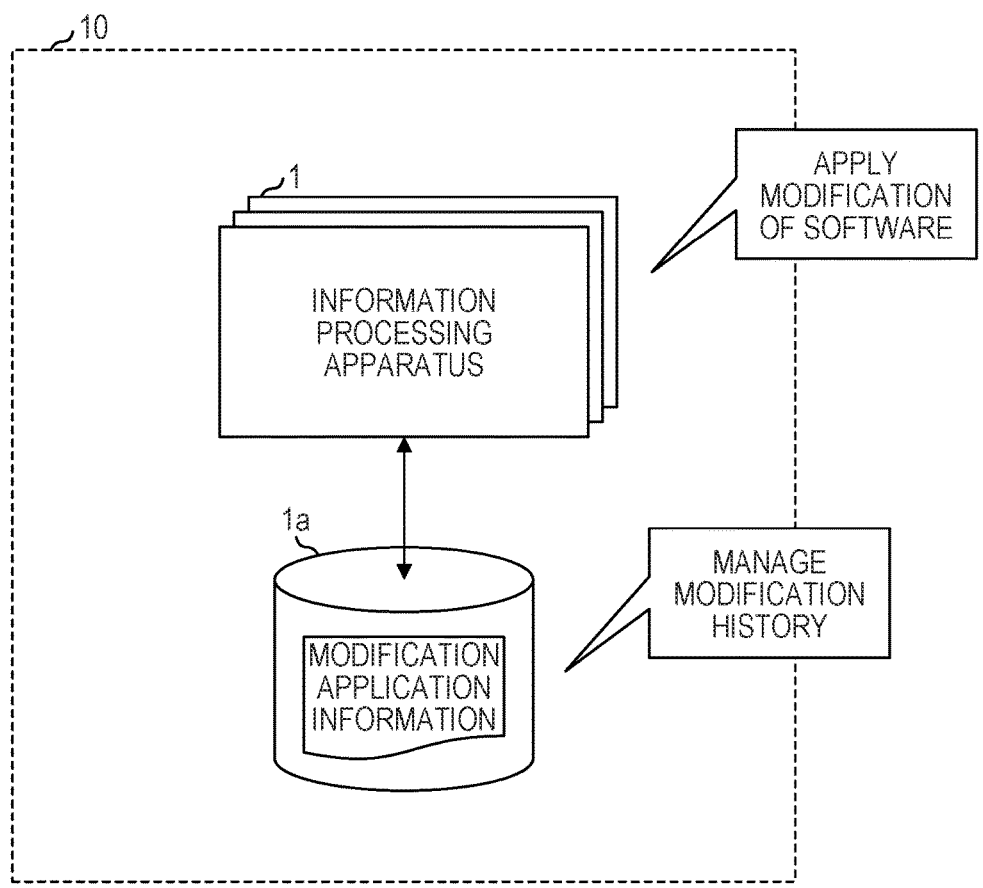
FIG. 1 is a diagram illustrating a configuration of an information processing system.

FIG. 1 is a diagram illustrating a configuration of an information processing system. An information processing system 10 illustrated in FIG. 1 includes an information processing apparatus 1 (hereinafter referred to as a "computer 1" or an "apparatus 1" for creating modification application information) including one or more physical machines. The information processing apparatus 1 may include, for example, virtual machines (VMs) created on the physical machines.

A business system for providing services to users is constructed in the information processing apparatus 1. The information processing apparatus 1 applies modifications to software (for example, application programs or middleware) executed as a part of the business system, or dissolves the applied modifications, as necessary.

The information processing apparatus 1 also includes a storage unit 1a for storing modification application information. The modification application information is information on a history of modifications applied to software and dissolution of the modifications. This allows the information processing apparatus 1 to manage the history of modifications applied to software and dissolution of the modifications.

The information processing apparatus 1 performs creation (hereinafter simply referred to as "information creation") of the modification application information. Specifically, when the modification application information stored in the storage unit is is deleted, for example, the information processing apparatus 1 performs creation (re-creation) of the modification application information.

Figure 2:
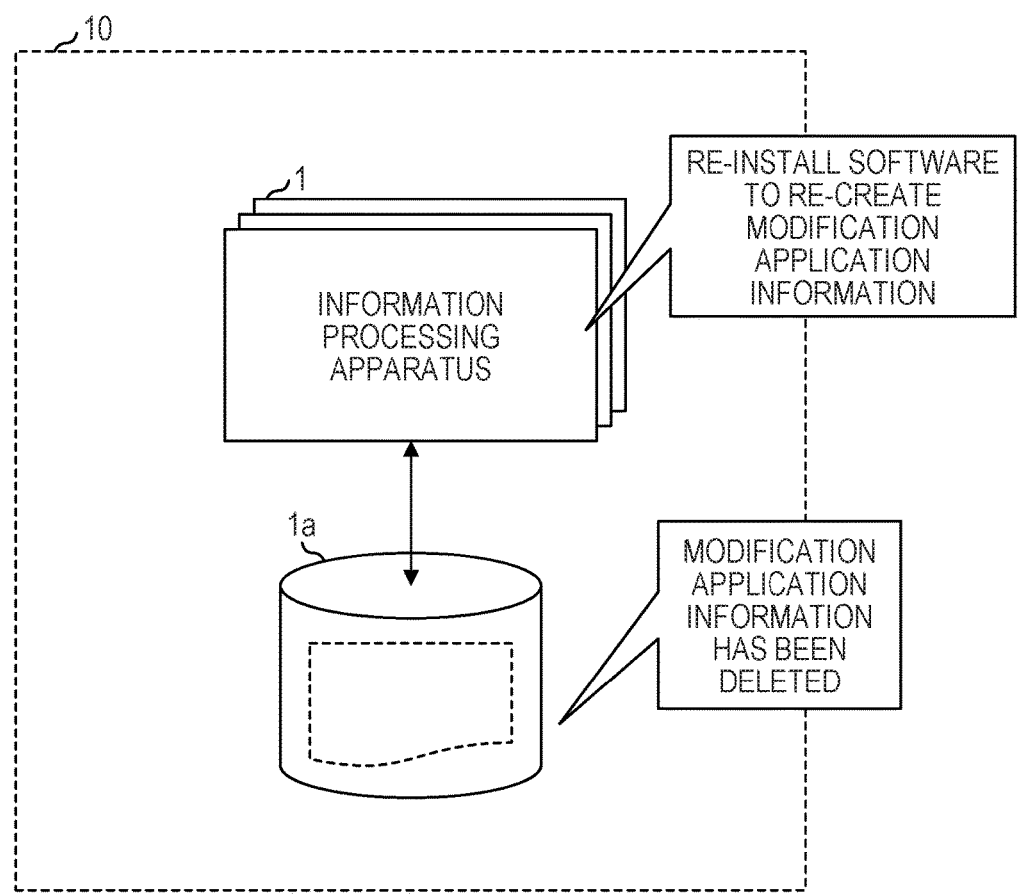
FIG. 2 is a diagram illustrating an example of a case in which modification application information has been deleted.

Next, an example of a case in which the modification application information has been deleted will be described. FIG. 2 is a diagram illustrating an example of a case in which the modification application information has been deleted.

There is a case where the modification application information illustrated in FIG. 1 is deleted due to a failure of the OS or the like, for example, as illustrated in FIG. 2. Specifically, for example, this case may be a case where the OS of the information processing apparatus 1 does not recognize software executed in the business system, and the modification application information corresponding to the software is deleted. In this case, the operator restores the deleted modification application information on the basis of the modification history (for example, information stored in the storage unit 1a) in which information on modifications applied to software and dissolution of the modifications is accumulated.

However, such a modification history is not created on the assumption that the modification history is used when the modification application information is created and may lack validity. Therefore, from the viewpoint of ensuring the validity, the operator is unable to make a determination on whether the modification application information created from the modification history is to be used in place of the deleted modification application information.

As illustrated in FIG. 2, the operator may re-install software (software corresponding to the deleted modification application information) to be executed in the business system. Then, the operator re-applies the modifications, which have been applied to the software before the re-installation, to the re-installed software. Thereafter, for example, the operator re-creates the modification application information on the basis of information (information identifying the applied modifications) on the re-applied modifications. Accordingly, the operator may re-create the modification application information with high validity.

However, in some cases, performing the re-installation of the software may require for the operator to take a huge amount of time and labor to reconstruct the business system. In addition, the re-installation of the software may have an effect on services to be provided to users. Therefore, the operator may be required to avoid the re-installation of the software as much as possible.

According to the embodiment, the information processing apparatus 1 restores the software to a state before application of the modifications on the basis of the modification application information of the software, which is created from a modification history of the software executed in the business system, and then re-applies the modifications to the software. Then, on the basis of information on the progress or results of dissolution of the modifications and re-application of the modifications to the software, the information processing apparatus 1 determines the validity of the modification application information created from the modification history.

That is, when the modifications actually applied to the software are different from modifications included in the modification application information created from the modification history, there is a high possibility that dissolution and re-application of the modifications to the software have been unsuccessfully completed. Therefore, the information processing apparatus 1 may detect a difference between the modifications actually applied to the software and the modifications included in the modification application information, for example, by determining whether or not the dissolution and re-application of the modifications to the software have been successfully completed. Then, in this case, the information processing apparatus 1 may update (modify) the modification application information created from the modification history.

Accordingly, even when the modification application information is deleted, the information processing apparatus 1 may acquire modification application information with high validity without requiring re-installation of software.

Figure 3:
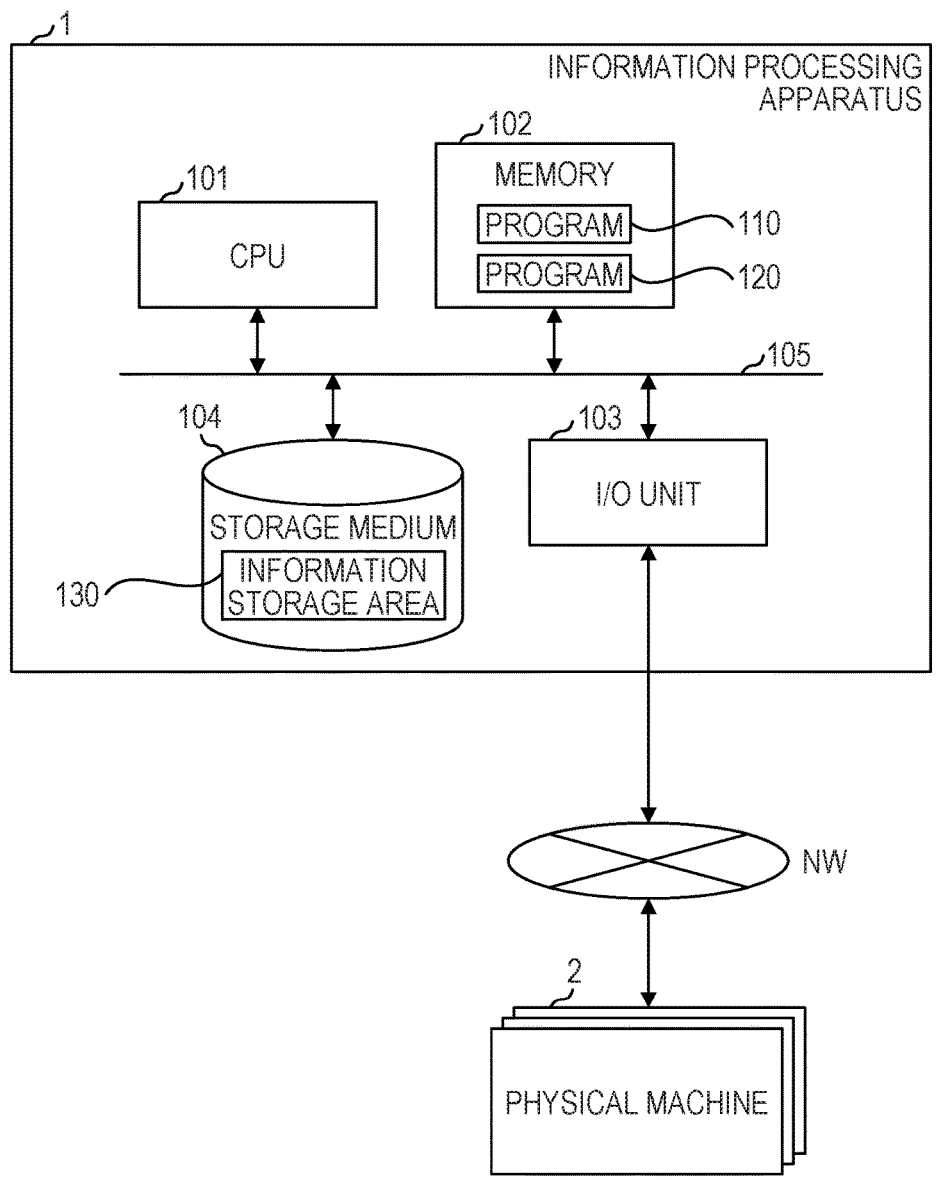
FIG. 3 is a diagram illustrating a hardware configuration of an information processing apparatus.

Next, the configuration of the information processing system 10 will be described. FIG. 3 is a diagram illustrating a hardware configuration of the information processing apparatus 1.

The information processing apparatus 1 includes a central processing unit (CPU) 101 (processor), a memory 102, an external interface 103 (I/O unit), and a storage medium 104. These components are connected with each other via a bus 105.

The storage medium 104 stores a program 110 (hereinafter referred to as a "modification application information creation program 110") for performing, for example, the above-described information creation in a program storage area (not illustrated) in the storage medium 104. The storage medium 104 also stores a program 120 (hereinafter referred to as a "service providing program 120") for performing processing (hereinafter referred to as a "service providing processing") of a business system for providing a service to a user. For example, the service providing program 120 may correspond to the software described above with reference to FIGS. 1 and 2. For example, the storage unit is described above with reference to FIG. 1 corresponds to an information storage area 130.

As illustrated in FIG. 3, in execution of the program 110, the CPU 101 loads the program 110 from the storage medium 104 into the memory 102 and executes the program 110 to perform the information creation. In addition, as illustrated in FIG. 3, in execution of the program 120, the CPU 101 loads the program 120 from the storage medium 104 into the memory 102 and executes the program 120 to perform the service providing processing.

The storage medium 104 has the information storage area 130 (hereinafter also referred to as a "storage unit 130") for storing therein information used to perform, for example, the information creation. The external interface 103 communicates with a physical machine 2, which is different from the information processing apparatus, via a network NW.

Figure 4:
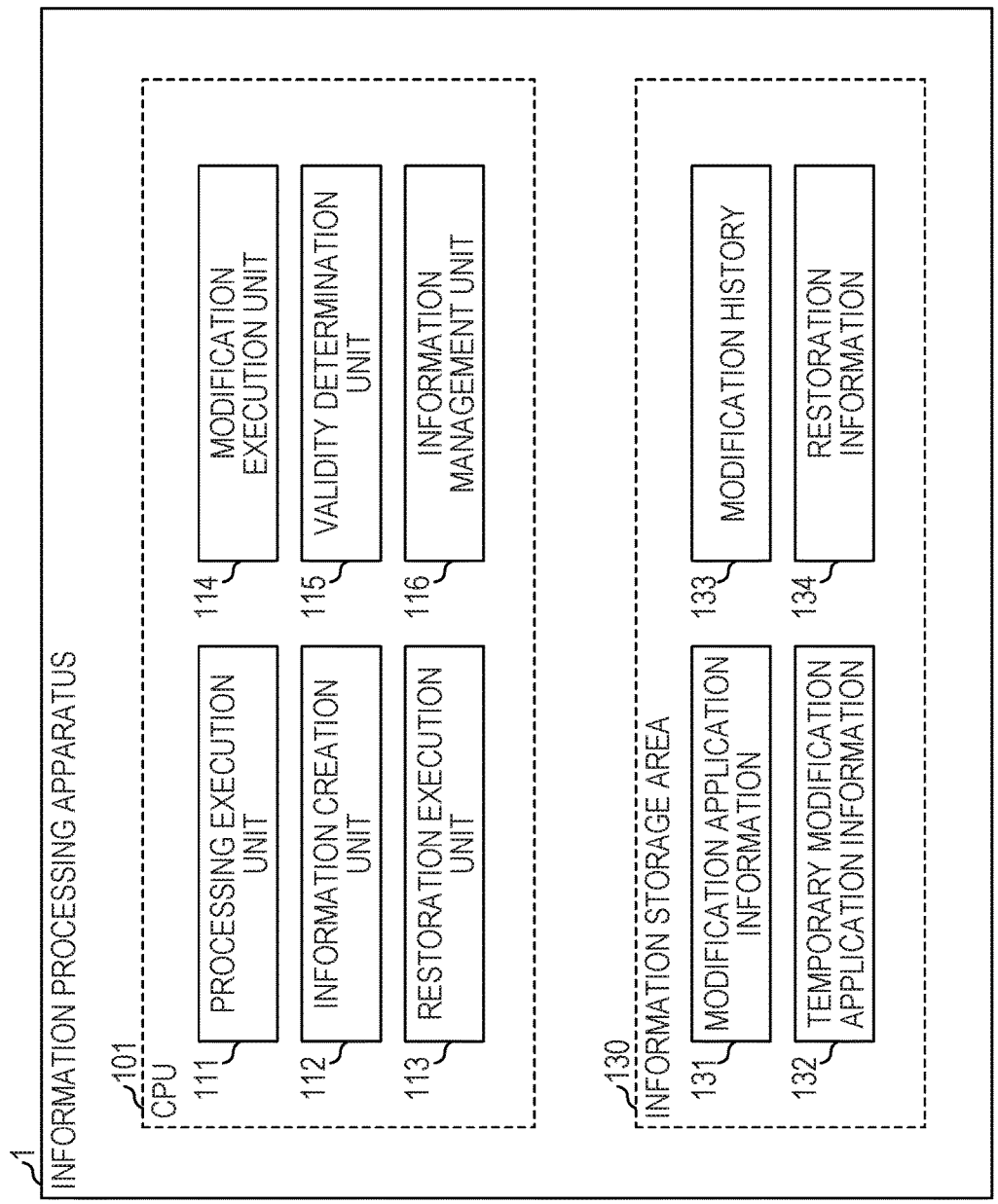
FIG. 4 is a diagram illustrating a functional configuration of an information processing apparatus.

Next, a functional configuration of the information processing apparatus 1 will be described. FIG. 4 is a diagram illustrating a functional configuration of the information processing apparatus 1 illustrated in FIG. 3. The CPU 101 acts as a processing execution unit 111, an information creation unit 112, a restoration execution unit 113, a modification execution unit 114, a validity determination unit 115, and an information management unit 116, by executing the program 110. In addition, modification application information 131, temporary modification application information 132, modification history 133, and restoration information 134 are stored in the information storage area 130 (hereinafter referred to as a "storage unit 130").

The processing execution unit 111 stores information on application of modifications and dissolution of modifications for the service providing program 120, as the modification history 133, in the information storage area 130.

The processing execution unit 111 applies modifications to the service providing program 120 or dissolves the modifications in response to, for example, a request from an operator. Specifically, the processing execution unit 111 may apply a modification to the service providing program 120 or dissolve the modification by, for example, updating a file (not illustrated) stored in the information storage area 130 or substituting a module (not illustrated).

When the modification application information 131 stored in the information storage area 130 has been deleted, the information creation unit 112 creates the temporary modification application information 132 including information on modifications (hereinafter referred to as a "first modifications") presumed to be currently applied to the service providing program 120 on the basis of the modification history 133. Specifically, the information creation unit 112 creates the temporary modification application information 132 on the basis of the version number information which is information on the modifications applied to the service providing program 120, among the information included in the modification history 133.

For example, the modification history 133 is information indicating results of manipulations performed for the service providing program 120. However, there is a possibility for any reason that some of information on modifications applied to the service providing program 120 or dissolution of the modifications is not reflected in the modification history 133. That is, the temporary modification application information 132 created from the modification history 133 may be inconsistent with the modifications (hereinafter referred to as "second modifications") actually applied to the service providing program 120.

The restoration execution unit 113 restores the service providing program 120 to a state before the application of the first modifications on the basis of the temporary modification application information 132 created by the information creation unit 112. Thereafter, the modification execution unit 114 re-applies the first modifications to the service providing program 120 restored by the restoration execution unit 113.

The validity determination unit 115 acquires a result (for example, information including the information on the progress of the dissolution of the first modifications) of the dissolution of the first modifications applied to the service providing program 120, which is performed by the restoration execution unit 113. In addition, the validity determination unit 115 acquires a result (for example, information including the information on the progress of the re-application of the first modifications) of the re-application of the first modifications applied to the service providing program 120, which is performed by the modification execution unit 114. Then, the validity determination unit 115 determines the validity of the temporary modification application information 132 on the basis of the acquired results. That is, the validity determination unit 115 determines whether or not there is a difference between the first modifications of which information is included in the temporary modification application information 132 and the second modifications actually applied to the service providing program 120.

When it is determined that the temporary modification application information 132 is not valid, for example, the validity determination unit 115 prompts an operator to update the temporary modification application information 132 created by the information creation unit 112. Accordingly, the operator may create the modification application information 131 including information on modifications closer to the second modifications than the first modifications. Then, for example, the information management unit 116 stores the modification application information 131 acquired by the operator in the information storage area 130.

When it is determined that the temporary modification application information 132 is valid, for example, the information management unit 116 stores the temporary modification application information 132 created by the information creation unit 112 in the information storage area 130, as the modification application information 131. That is, in this case, the operator may create the modification application information 131 without performing re-installation of the service providing program 120.

The restoration information 134 will be described later. Hereinafter, the information creation unit 112, the restoration execution unit 113, the modification execution unit 114, the validity determination unit 115, and the information management unit 116 may be operated in physical or virtual machines different from the information processing apparatus 1.

Figure 5:
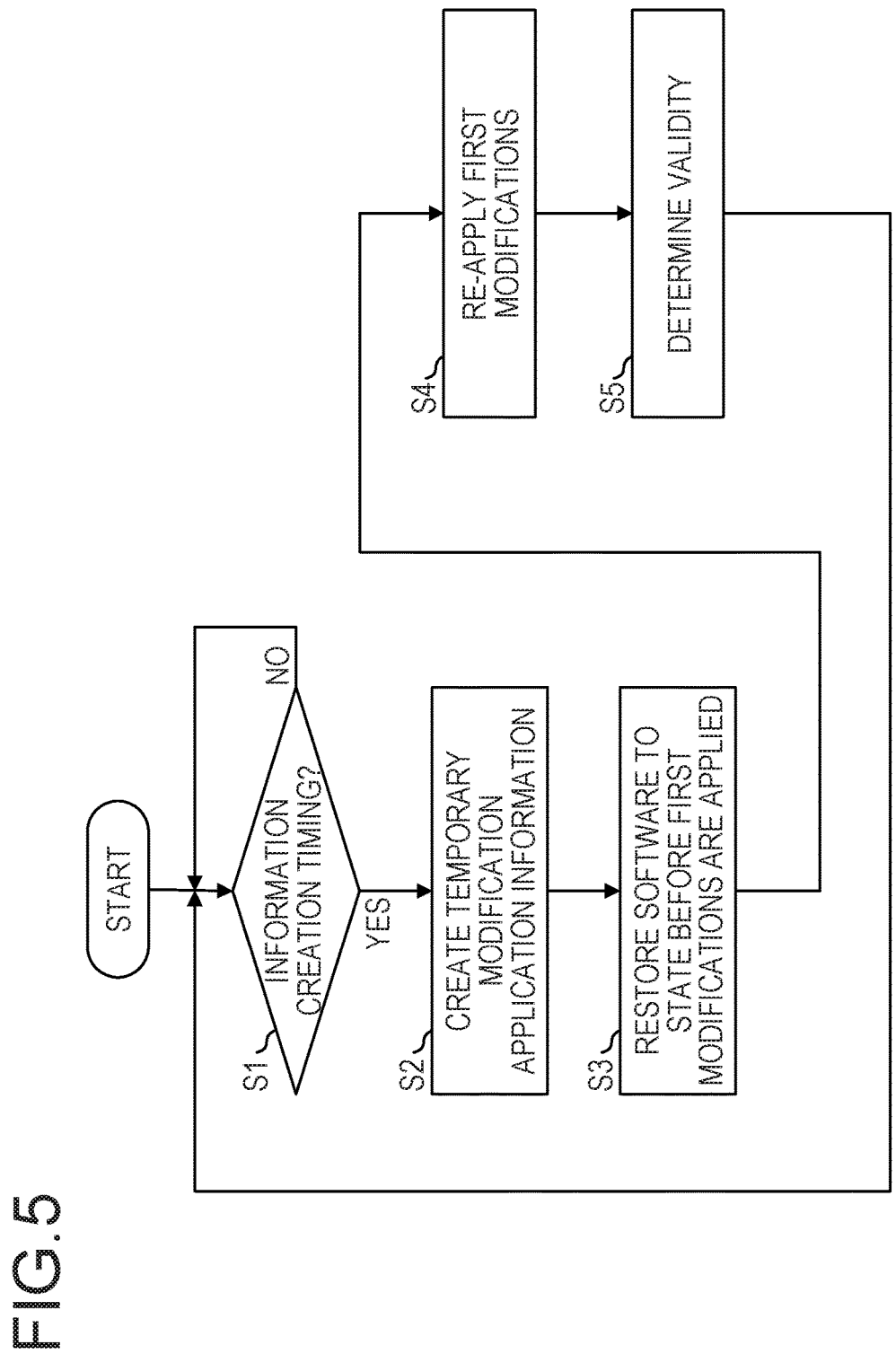
FIG. 5 is a flowchart illustrating information creation according to an embodiment.
Figure 6:
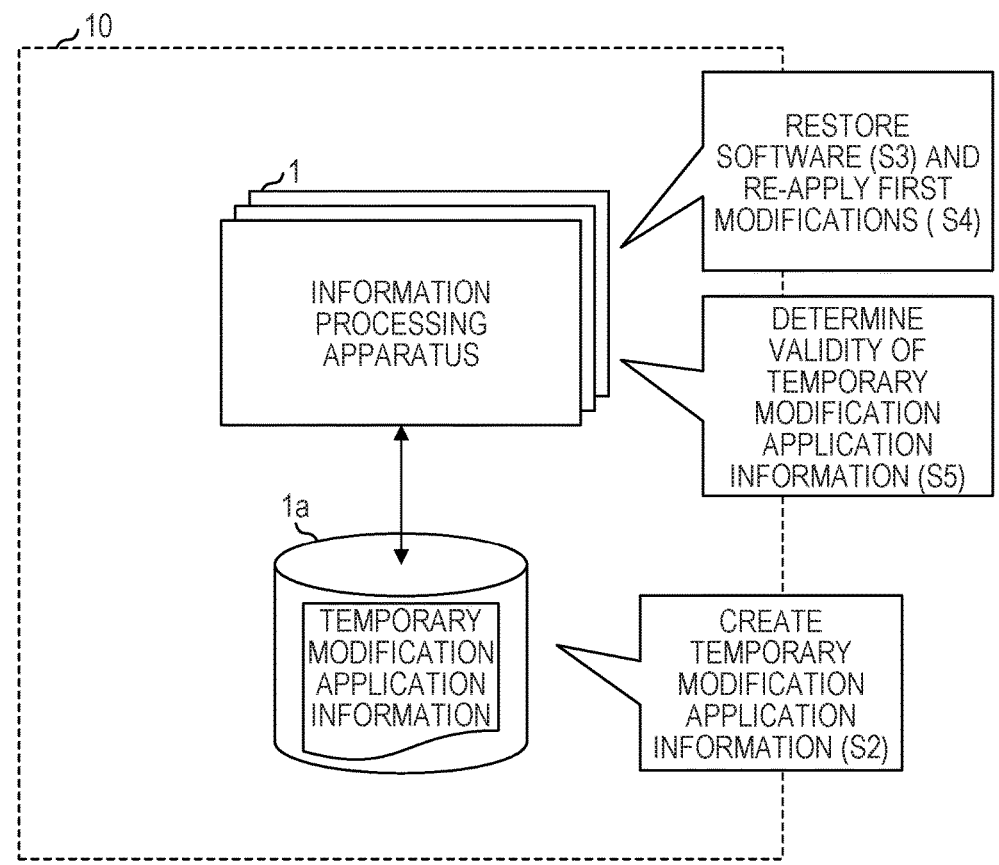
FIG. 6 is a diagram illustrating information creation according to an embodiment.

Next, the embodiment will be described. FIG. 5 is a flowchart illustrating information creation according to the embodiment. FIG. 6 is a diagram illustrating information creation according to the embodiment. The information creation will be described below with reference to FIGS. 5 and 6.

As illustrated in FIG. 5, the information processing apparatus 1 waits until an information creation timing ("NO" in S1). The information creation timing may be a timing at which the information processing apparatus 1 detects that the modification application information 131 stored in the information storage area 130 is deleted due to, for example, a failure of the OS.

At the information creation timing ("YES" in S1), as illustrated in FIG. 6, the information processing apparatus 1 creates the temporary modification application information 132 from the modification history 133 stored in the information storage area 130 (S2). Specifically, the information processing apparatus 1 creates the temporary modification application information 132 on the basis of the version number information of the service providing program 120 included in the modification history 133. Since the temporary modification application information 132 is created from the modification history 133, the temporary modification application information 132 may be inconsistent with the information corresponding to the second modifications actually applied to the service providing program 120.

Then, as illustrated in FIG. 6, on the basis of the temporary modification application information 132 acquired at S2, the information processing apparatus 1 restores the service providing program 120 to a state before the application of the first modifications (S3). Thereafter, the information processing apparatus 1 re-applies the first modifications to the service providing program 120 restored at S3 (S4). Then, on the basis of the information on the progress or results of S3 and S4, the information processing apparatus 1 determines the validity of the temporary modification application information 132 created at S2 (S5).

That is, when there exists a difference between the first modifications and the second modifications, S3 and S4 may be unsuccessfully completed. Specifically, for example, there occurs an event where a file, which is not supposed to exist when the service providing program 120 is successfully restored, is stored in the information storage area 130.

Therefore, the information processing apparatus 1 may determine the validity of the temporary modification application information 132, for example, by dissolving and re-applying the first modifications and verifying the information on the progress or results. Then, when the temporary modification application information 132 has the validity, the information processing apparatus 1 may use the temporary modification application information 132 in place of the deleted modification application information 131. Accordingly, when the modification application information 131 is deleted, the information processing apparatus 1 may re-create the modification application information 131 without performing a task such as re-installation of the service providing program 120.

In this way, according to the embodiment, on the basis of the version number information of the service providing program 120 executed in a business system to be managed, which is included in the modification history 133 of the service providing program 120 executed in the business system, the information processing apparatus 1 creates the temporary modification application information 132 which is the information on the first modifications applied to the service providing program 120. Then, on the basis of the created temporary modification application information 132, the information processing apparatus 1 restores the service providing program 120 to a state before the application of the first modifications and then re-applies the first modifications to the restored service providing program 120. Thereafter, on the basis of the information on the progress or results of the dissolution and re-application of the first modifications applied to the service providing program 120, the information processing apparatus 1 determines the validity of the temporary modification application information 132.

Accordingly, the information processing apparatus 1 may create the modification application information 131 with high validity without performing a task such as re-installation of the service providing program 120.

Figure 7:
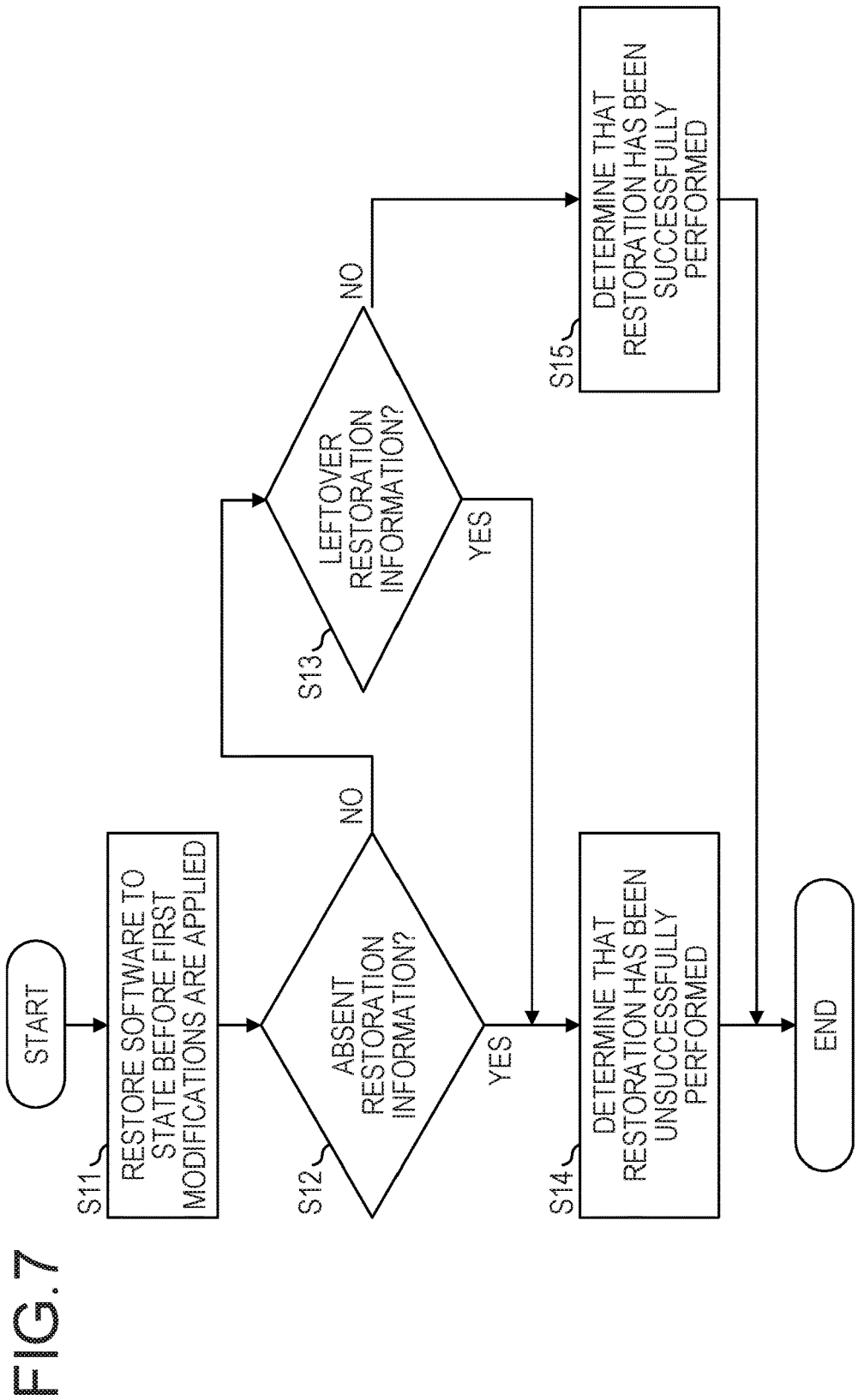
FIG. 7 is a flowchart illustrating details of information creation according to an embodiment.
Figure 8:
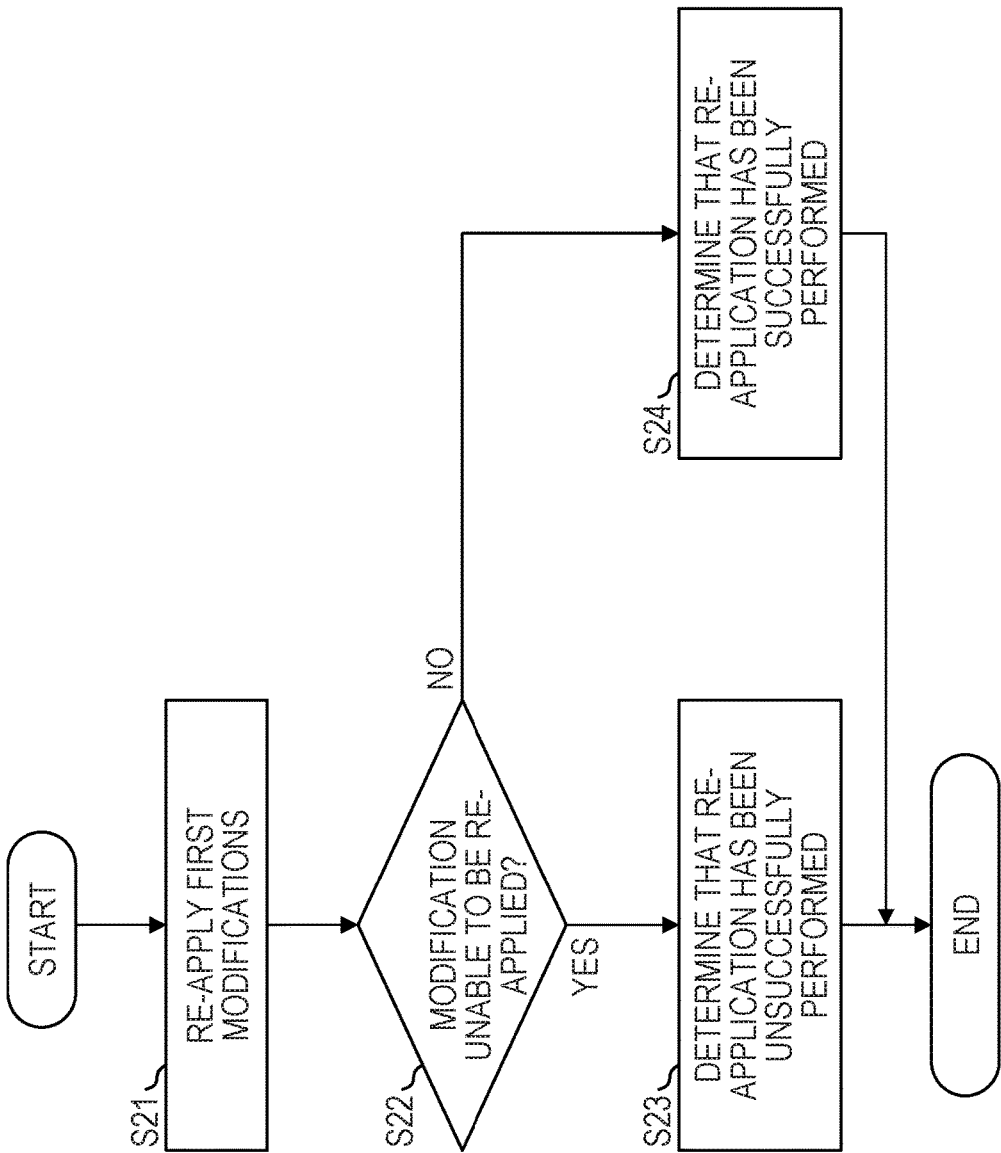
FIG. 8 is a flowchart illustrating details of information creation according to an embodiment.
Figure 9:
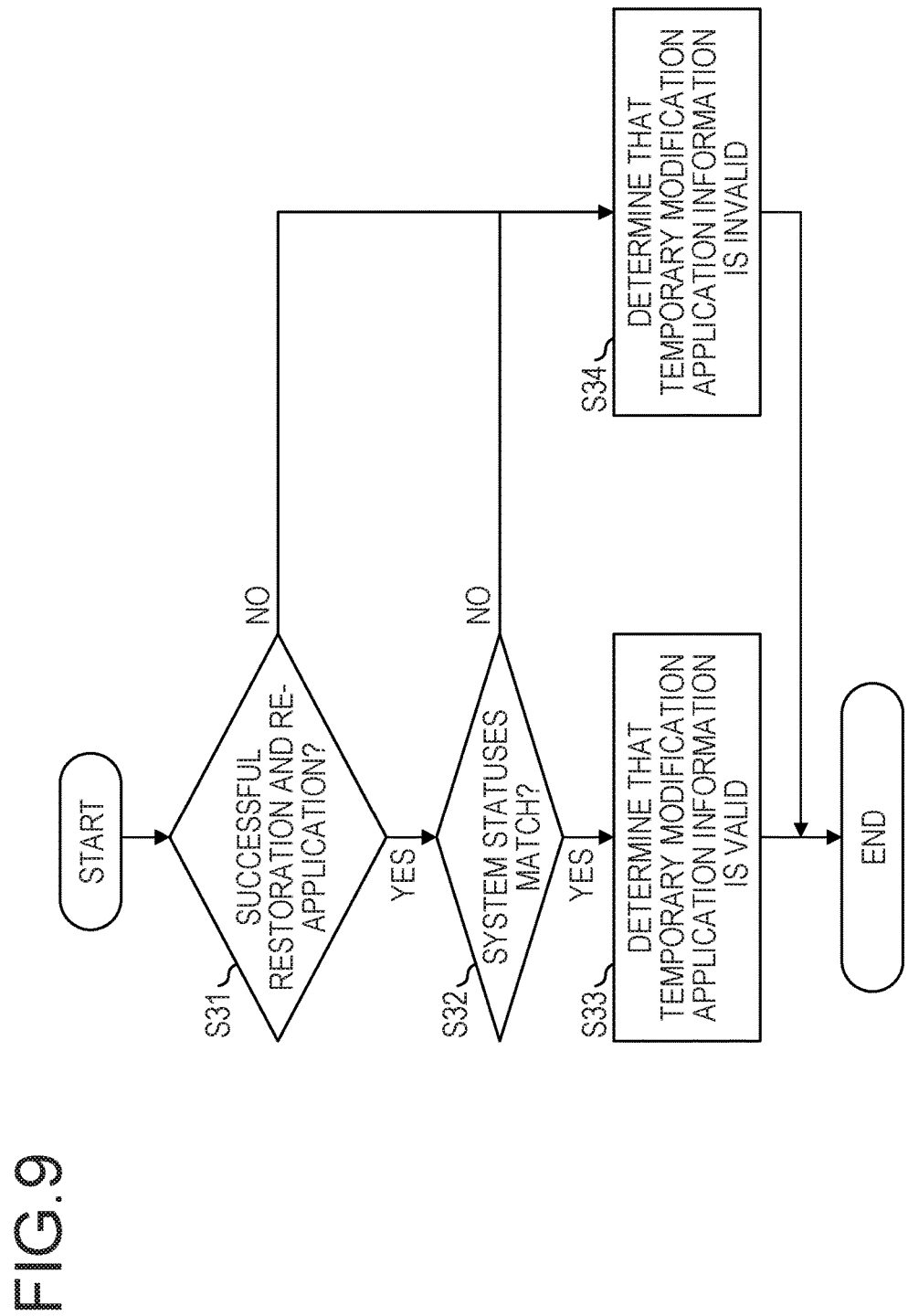
FIG. 9 is a flowchart illustrating details of information creation according to an embodiment.

Next, details of the embodiment will be described. FIGS. 7 to 9 are flowcharts illustrating the details of the information creation according to the embodiment. Specifically, FIG. 7 is a flowchart illustrating the details of S3. FIG. 8 is a flowchart illustrating the details of S4. FIG. 9 is a flowchart illustrating the details of S5. FIGS. 10 to 29 are diagrams illustrating the details of the information creation according to the embodiment. The information creation will be described below in detail with reference to FIGS. 5, 7, and 9 to 29.

The information creation unit 112 of the information processing apparatus 1 waits until an information creation timing ("NO" in S1 of FIG. 5). Thereafter, at the information creation timing ("YES" in S1 of FIG. 5), the information creation unit 112 creates the temporary modification application information 132 from the modification history 133 (S2 of FIG. 5). Hereinafter, details of the modification history 133 and the temporary modification application information 132 will be described.

FIG. 10 is a diagram illustrating an example of the modification history 133. Each entry of the modification history 133 illustrated in FIG. 10 has an item of "ID" for identifying each entry of the modification history 133 and an item of "Manipulation" indicating contents of a manipulation performed for the service providing program 120. The "Manipulation" is set with, for example, "Application of modification" indicating that modification is applied to the service providing program 120 and "Dissolution of modification" indicating that dissolution of the modification is performed for the service providing program 120.

Each entry of the modification history 133 illustrated in FIG. 10 also has an item of "Result" indicating a result of the manipulation performed for the service providing program 120 and an item of "Detailed information" uniquely identifying the manipulation performed for the service providing program 120. Each entry of the modification history 133 illustrated in FIG. 10 further has an item of "Product name" indicating a product name corresponding to the service providing program 120.

Specifically, in the modification history 133 illustrated in FIG. 10, for an entry with "ID" of "1", "Application of modification" is set in "Manipulation", "Successful" is set in "Result", "T001WP-01" is set in "Detailed information", and "Product B" is set in "Product name". In the modification history 133 illustrated in FIG. 10, for an entry with "ID" of "2", "Dissolution of modification" is set in "Manipulation", "Unsuccessful" is set in "Result", "T001WP-01" is set in "Detailed information", and "Product B" is set in "Product name". Description about other entries of the modification history 133 illustrated in FIG. 10 is omitted.

In the modification history 133 illustrated in FIG. 10 includes entries indicating that a modification with "Detailed information" of "T001WP-01" is successfully applied and the service providing program 120 is unsuccessfully restored to a state before the application of the modification (entries with "ID" of "1" and "2"). That is, the modification history 133 illustrated in FIG. 10 indicates that the modification with "Detailed information" of "T001WP-01" has been applied to the service providing program 120.

In addition, the modification history 133 illustrated in FIG. 10 indicates that a modification with "Detailed information" of "T002WP-01", "T003WP-01", and "T002WP-02" have been applied to the service providing program 120 (information with "ID" of "3", "4", and "7").

Further, the modification history 133 illustrated in FIG. 10 includes entries indicating that a modification with "Detailed information" of "T004WP-01" is successfully applied and the service providing program 120 is successfully restored to a state before the application of the modification (information with "ID" of "5" and "6"). That is, the modification history 133 illustrated in FIG. 10 indicates that the modification with "Detailed information" of "T004WP-01" has not been applied to the service providing program 120.

Figure 11:
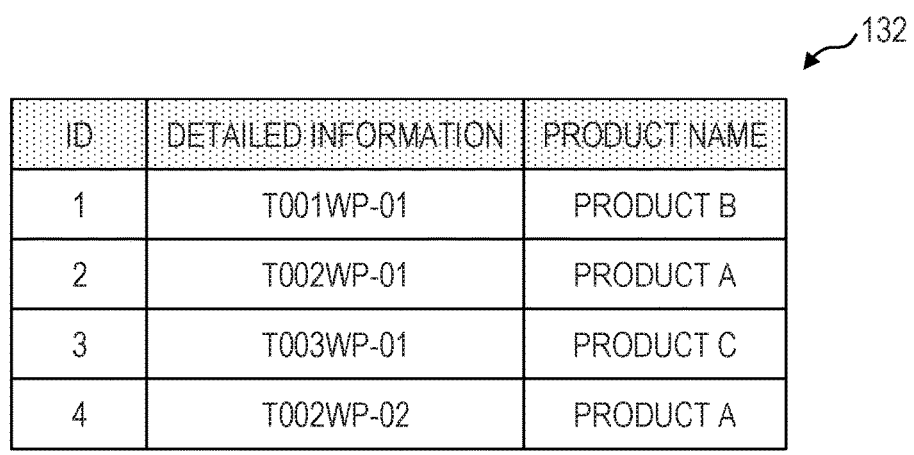
FIG. 11 is a diagram illustrating an example of temporary modification application information.

Next, a specific example of the temporary modification application information 132 will be described. FIG. 11 is a diagram illustrating an example of the temporary modification application information 132. It is assumed that the temporary modification application information 132 illustrated in FIG. 11 is created from the contents of the modification history 133 illustrated in FIG. 10 (S2 in FIG. 5).

Each entry of the temporary modification application information 132 illustrated in FIG. 11 has "ID", "Detailed information", and "Product name" among the items in the modification history 133 illustrated in FIG. 10. Specifically, for an entry with "ID" of "1", "T001WP-01" is set in "Detailed information" and "Product B" is set in "Product name". Description about other entries of the temporary modification application information 132 illustrated in FIG. 11 is omitted.

That is, entries of the modification history 133 illustrated in FIG. 11 include "Detailed information" corresponding to modifications (first modifications) presumed to be currently applied to the service providing program 120 from the contents included in the modification history 133 illustrated in FIG. 10.

Returning to FIG. 7, on the basis of the temporary modification application information 132 created at S2, the restoration execution unit 113 of the information processing apparatus 1 restores the service providing program 120 to a state before the application of the first modifications (S11). Thereafter, the validity determination unit 115 of the information processing apparatus 1 determines whether or not there exists, among the first modifications, a modification for which an execution file (hereinafter referred to as the "restoration information 134") required to dissolve the modification is absent (S12).

When it is determined that there exists a modification for which the restoration information 134 is absent ("YES" in S12), the validity determination unit 115 determines that the dissolution of modifications at S11 is unsuccessfully performed (S14).

When it is determined that there exists no modification for which the restoration information 134 is absent ("NO" in S12), the validity determination unit 115 determines whether or not there exists leftover restoration information 134, that is, restoration information 134 not used in S11, among the restoration information 134 stored in the information storage area 130 (S13). When it is determined that there exists leftover restoration information 134 ("YES" in S13), the validity determination unit 115 determines that the dissolution of modifications at S11 is unsuccessfully performed (S14).

When it is determined that there exists no leftover restoration information 134 ("NO" in S13), the validity determination unit 115 determines that the dissolution of modifications at S11 is successfully performed (S15).

Next, as illustrated in FIG. 8, the modification execution unit 114 of the information processing apparatus 1 re-applies the first modifications to the service providing program 120 restored at S11 (S21). Then, the modification execution unit 114 determines whether or not there exists a modification which is unable to be re-applied, among the first modifications (S22).

When it is determined that there exists a modification which is unable to be re-applied ("YES" in S22), the validity determination unit 115 determines that the re-application of modifications at S21 has been unsuccessfully performed (S23). When it is determined that there exists no modification which is unable to be re-applied ("NO" in S22), the validity determination unit 115 determines that the re-application of modifications at S21 has been successfully performed (S24).

Thereafter, as illustrated in FIG. 9, the validity determination unit 115 determines whether or not the dissolution of the modifications at S3 and the re-application of the modifications at S4 have been successfully performed (S31). Specifically, for example, on the basis of the results determined in the S12, S13, and S22 illustrated in FIGS. 7 and 8, the validity determination unit 115 determines whether or not the S3 and S4 have been successfully performed.

When it is determined that the S3 and S4 have been successfully performed ("YES" in S31), the validity determination unit 115 compares the status of the business system before S3 and the status of the business system after S4 to determine whether or not the statuses of the business system operating in the information processing apparatus 1 match (S32).

When it is determined that the statuses of business system match ("YES" in S32), the validity determination unit 115 determines that the temporary modification application information 132 created at S2 is valid (S33). When it is determined that the S3 and S4 have been unsuccessfully performed ("NO" in S31) or when it is determined that the statuses of business system do not match ("NO" in S32), the validity determination unit 115 determines that the temporary modification application information 132 created at S2 is invalid (S34). Hereinafter, a first example of the S3 and S4 will be described.

Figure 12:
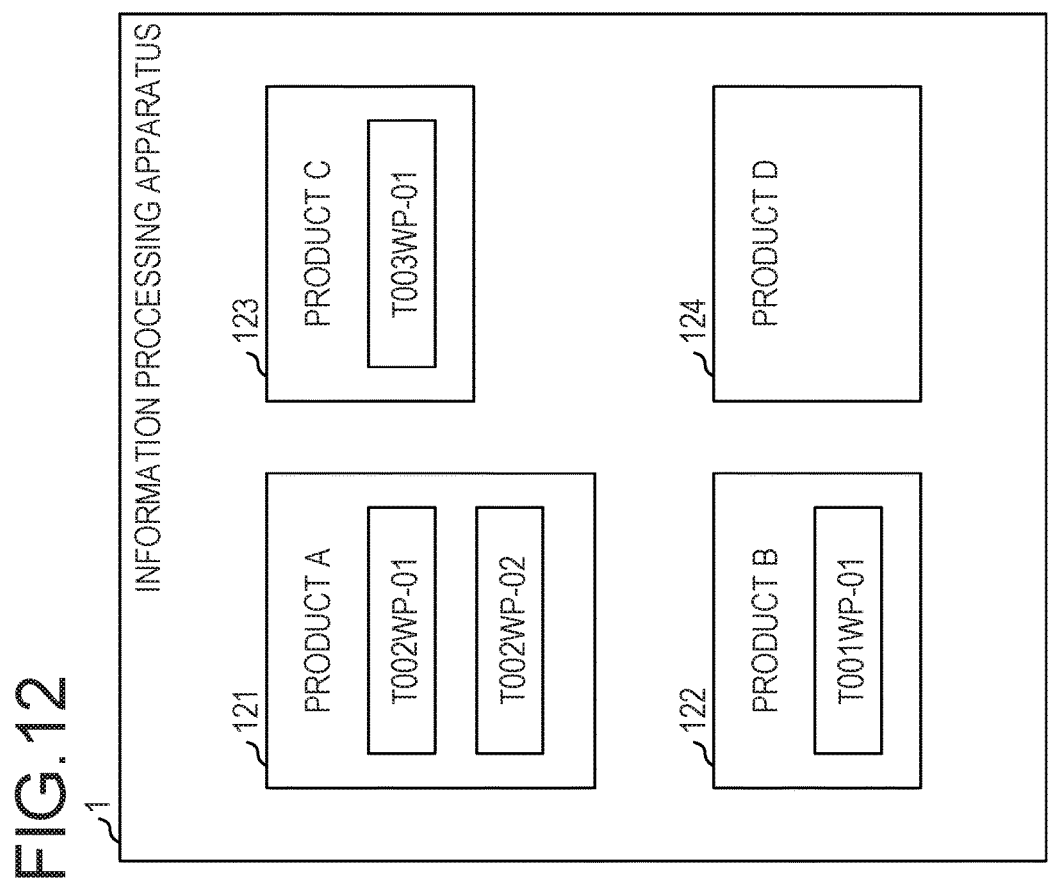
FIG. 12 is a diagram illustrating a first example of S3 and S4.
Figure 13:
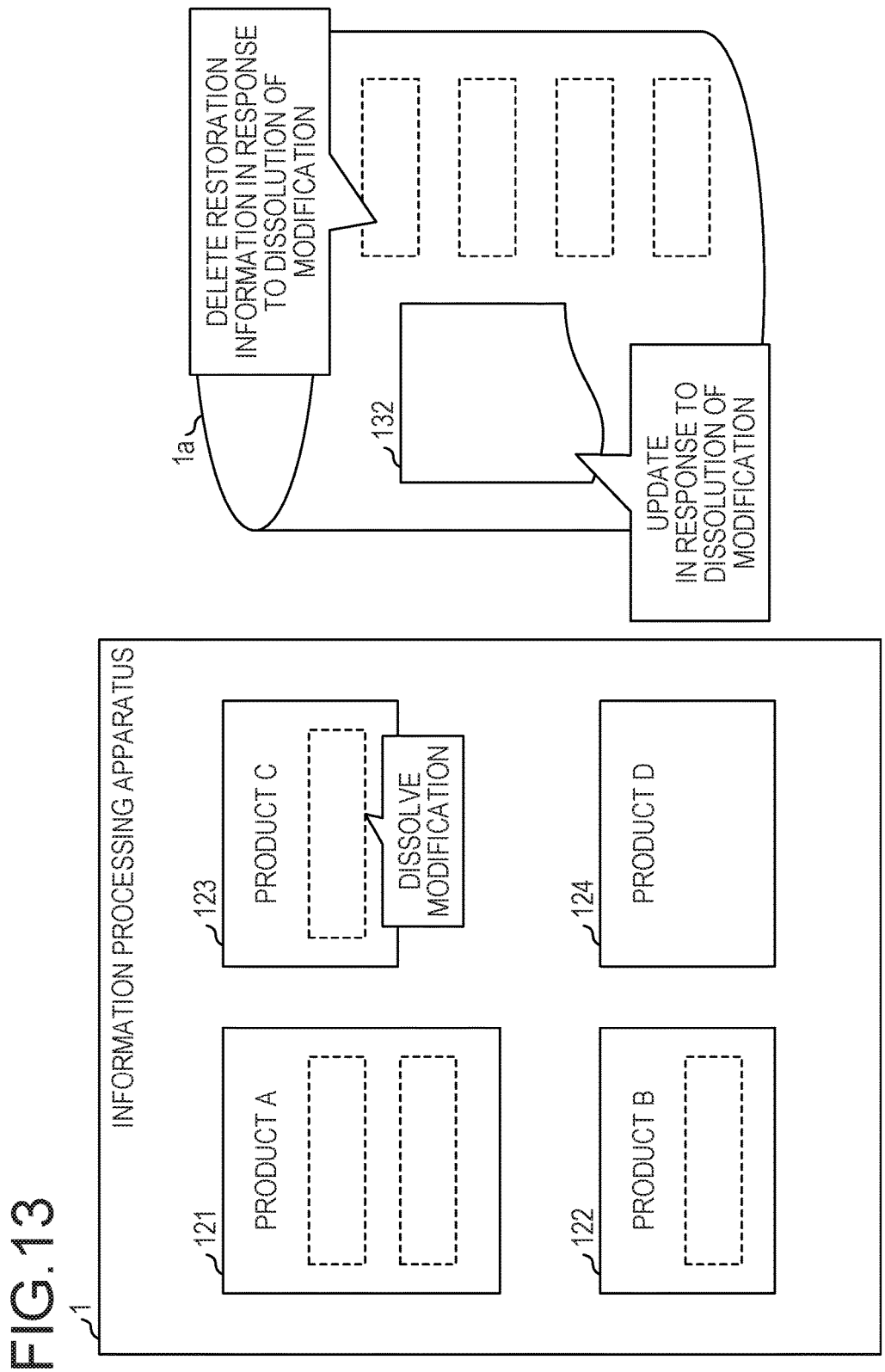
FIG. 13 is a diagram illustrating a first example of S3 and S4.
Figure 14:
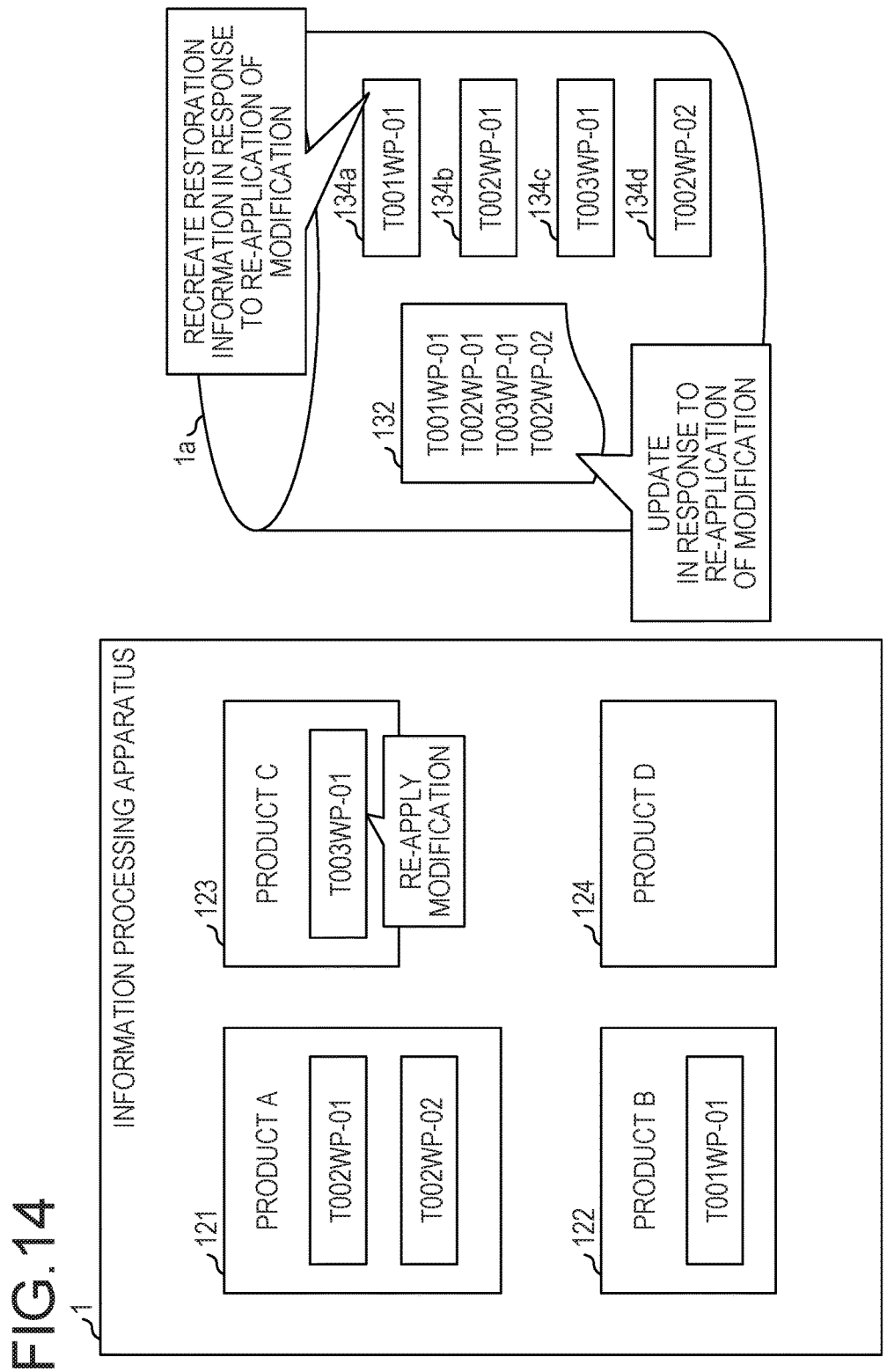
FIG. 14 is a diagram illustrating a first example of S3 and S4.

FIGS. 12 to 14 are diagrams illustrating the first example of S3 and S4. The example illustrated in FIGS. 12 to 14 corresponds to the modification history 133 illustrated in FIG. 10 and the temporary modification application information 132 illustrated in FIG. 11.

In the example illustrated in FIG. 12, as the service providing programs 120, a product A 121, a product B 122, a product C 123 and a product D 124 (hereinafter simply referred to as a product A, a product B, a product C, and a product D, respectively) are installed in the information processing apparatus 1. In the example illustrated in FIG. 12, modifications respectively identified by T002WP-01 and T002WP-02 are applied to the product A, a modification identified by T001WP-01 is applied to the product B, a modification identified by T003WP-01 is applied to the product C, and no modification is applied to the product D.

In the example illustrated in FIG. 12, the temporary modification application information 132 created by the information creation unit 112 is stored in the storage unit is (the information storage area 130) (S2 of FIG. 5). Specifically, the temporary modification application information 132 illustrated in FIG. 12 includes information indicating that modifications identified by T001WP-01, T002WP-01, T003WP-01 and T002WP-02 are applied to one of the product A, the product B, the product C, and the product D.

In addition, in the example illustrated in FIG. 12, restoration information 134 corresponding to each of the modifications applied to the product A, the product B, the product C, and the product D is stored in the storage unit 1a. Specifically, restoration information 134a corresponding to T001WP-01, restoration information 134b corresponding to T002WP-01, restoration information 134c corresponding to T003WP-01, and restoration information 134d corresponding to T002WP-02 are stored in the storage unit is illustrated in FIG. 12.

It is assumed that the restoration information 134 is created when a modification is applied to one of the product A, the product B, the product C, and the product D and deleted when the modification applied to one of the product A, the product B, the product C, and the product D is dissolved.

In the example of FIG. 12, the restoration execution unit 113 dissolves the first modifications presumed to be applied to the product A, the product B, the product C, and the product D by referring to the contents set in the temporary modification application information 132 (S11). Specifically, as illustrated in FIG. 13, the restoration execution unit 113 dissolves the modifications identified by T002WP-01 and T002WP-02 presumed to be applied to the product A, the modification identified by T001WP-01 presumed to be applied to the product B, and the modification identified by T003WP-01 presumed to be applied to the product C. In this case, as illustrated in FIG. 13, the restoration execution unit 113 deletes the restoration information 134 corresponding to each modification.

In addition, the restoration execution unit 113 updates the temporary modification application information 132 in response to the dissolution of the modifications applied to the product A, the product B, the product C, and the product D. Specifically, as illustrated in FIG. 13, the restoration execution unit 113 performs an update to delete information indicating T001WP-01, T002WP-01, T003WP-01, and T002WP-02 from the temporary modification application information 132.

Here, the state illustrated in FIG. 13 is a state where there exists no modification for which the restoration information 134 is absent, among the first modifications ("NO" in S12).

In addition, the state illustrated in FIG. 13 is a state where there exists no leftover restoration information 134, among the restoration information 134 ("NO" in S13). Therefore, in the example illustrated in FIG. 13, the validity determination unit 115 determines that the dissolution of the modifications at S11 has been successfully performed (S15).

Thereafter, as illustrated in FIG. 14, the modification execution unit 114 re-applies each of the modifications applied to the product A, the product B, the product C, and the product D (S21). In addition, the modification execution unit 114 updates the temporary modification application information 132. Specifically, the modification execution unit 114 performs an update to add information indicating T001WP-01, T002WP-01, T003WP-01, and T002WP-02 to the temporary modification application information 132. In this case, as illustrated in FIG. 14, the modification execution unit 114 re-creates the restoration information 134 corresponding to each modification.

When it is determined that there exists no modification which is unable to be re-applied, among the modifications applied to the product A, the product B, the product C, and the product D ("NO" in S22), the validity determination unit 115 determines that the re-application of the modifications at S21 has been successfully performed (S24). When it is determined that there exists a modification which is unable to be re-applied ("YES" in S22), the validity determination unit 115 determines that the re-application of the modifications at S21 has been unsuccessfully performed (S23). Hereinafter, a second example of the S3 and S4 will be described.

Figure 16:
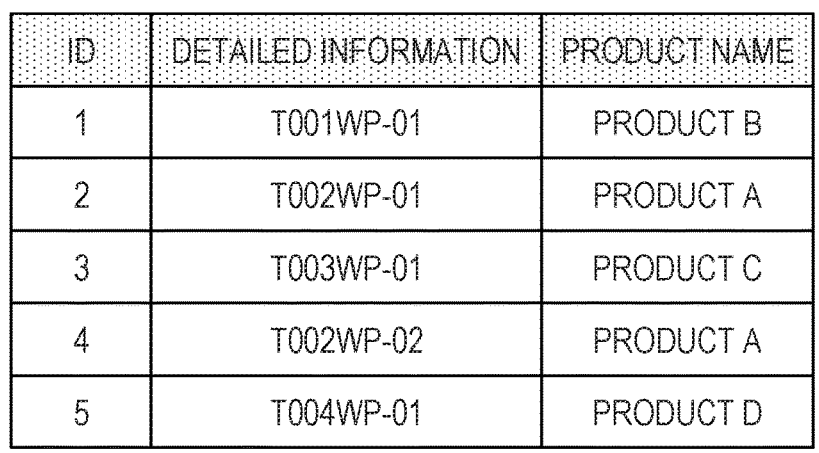
FIG. 16 is a diagram illustrating an example of temporary modification application information corresponding to the modification history illustrated in FIG. 15.

Next, the second example of the S3 and S4 will be described. FIG. 15 is a diagram illustrating an example of the modification history 133 in a case where the entry with "ID" of "6" is lost from the entries included in the modification history 133 illustrated in FIG. 10. FIG. 16 is a diagram illustrating an example of the temporary modification application information 132 corresponding to the modification history 133 illustrated in FIG. 15.

That is, in the modification history 133 illustrated in FIG. 10, the entry with "ID" of "6" is an entry indicating that a modification with "Detailed information" identified by "T004WP-01" is dissolved. Therefore, in comparison with the temporary modification application information 132 illustrated in FIG. 11, the temporary modification application information 132 illustrated in FIG. 16 includes information (with "ID" of "5") indicating that the modification identified by "T004WP-01" is applied to the product D (which is different from the actual status). Hereinafter, the second example of the S3 and S4 will be described with reference to FIGS. 15 and 18.

Figure 17:
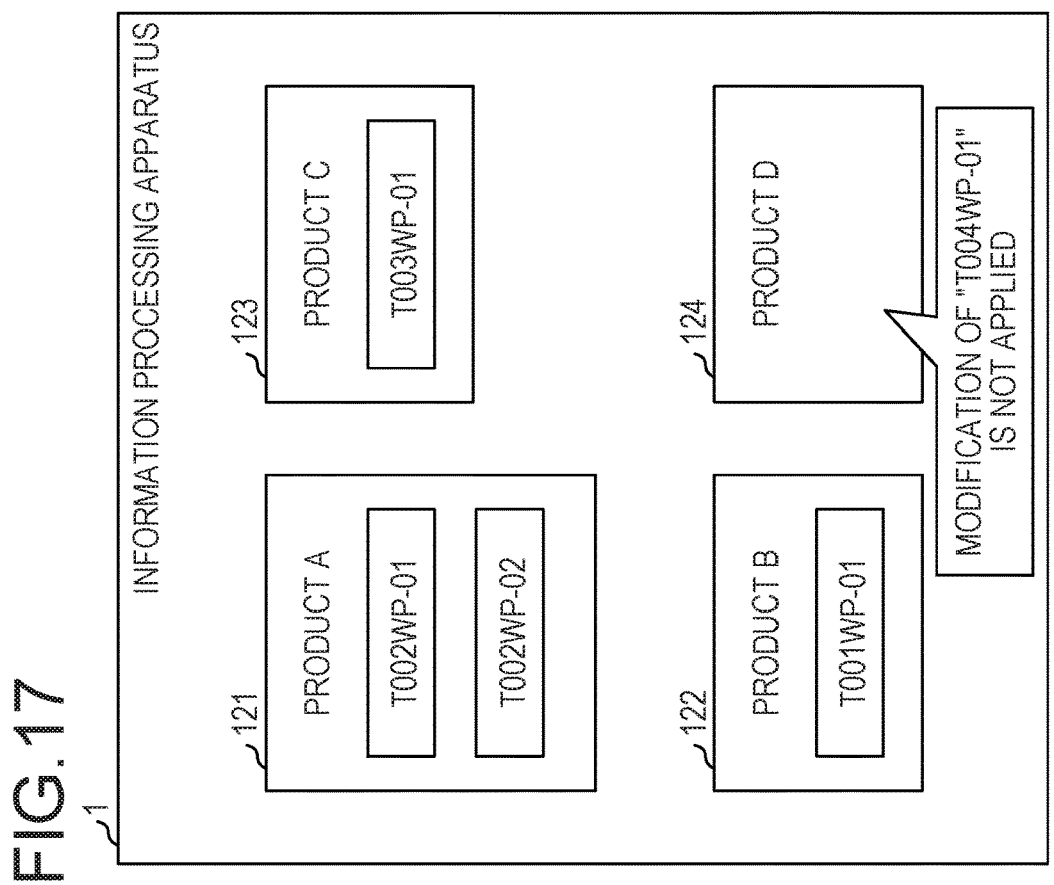
FIG. 17 is a diagram illustrating a second example of S3 and S4.

FIGS. 17 and 18 are diagrams illustrating the second example of the S3 and S4. In the example illustrated in FIG. 17, as in the example illustrated in FIG. 12 and so on, as the service providing programs 120, a product A, a product B, a product C, and a product D are installed in the information processing apparatus 1. In the example illustrated in FIG. 17, modifications respectively identified by T002WP-01 and T002WP-02 are applied to the product A, a modification identified by T001WP-01 is applied to the product B, a modification identified by T003WP-01 is applied to the product C, and no modification is applied to the product D.

In the example illustrated in FIG. 17, the temporary modification application information 132 illustrated in FIG. 16 is stored in the storage unit 1a. Specifically, the temporary modification application information 132 illustrated in FIG. 17 includes information indicating that modifications identified by T001WP-01, T002WP-01, T003WP-01, T002WP-02, and T004WP-01 are applied to one of the product A, the product B, the product C, and the product D.

In addition, in the example illustrated in FIG. 17, restoration information 134 corresponding to each of the modifications applied to the product A, the product B, the product C, and the product D is stored in the storage unit 1a. Specifically, restoration information 134a corresponding to T001WP-01, restoration information 134b corresponding to T002WP-01, restoration information 134c corresponding to T003WP-01, and restoration information 134d corresponding to T002WP-02 are stored in the storage unit is illustrated in FIG. 17.

The restoration information 134 is created when a modification is applied to each product in the information processing apparatus 1. Therefore, the restoration information 134 corresponding to each modification applied to the information processing apparatus 1 is stored in the storage unit 1a.

In the example illustrated in FIG. 17, the restoration execution unit 113 dissolves the modifications presumed to be applied to the product A, the product B, the product C, and the product D by referring to the contents set in the temporary modification application information 132 (S11). Specifically, as illustrated in FIG. 18, the restoration execution unit 113 dissolves the modifications identified by T002WP-01 and T002WP-02 presumed to be applied to the product A, the modification identified by T001WP-01 presumed to be applied to the product B, and the modification identified by T003WP-01 presumed to be applied to the product C. In addition, the restoration execution unit 113 tries to dissolve the modification identified by T004WP-01 presumed to be applied to the product D.

However, the restoration information 134 corresponding to T004WP-01 is not stored in the storage unit is illustrated in FIG. 17. Therefore, as illustrated in FIG. 18, the restoration execution unit 113 is unable to dissolve the modification identified by T004WP-01. As a result, in the example illustrated in FIG. 18, the restoration execution unit 113 determines that there exists a modification for which the restoration information 134 is absent, among the first modifications ("YES" in S12) and determines that the dissolution of modifications at S11 has been unsuccessfully performed (S14).

Thereafter, the modification execution unit 114 re-applies the modifications (identified by T001WP-01, T002WP-01, T003WP-01, and T002WP-02) dissolved at S11 (S21). Hereinafter, a third example of the S3 and S4 will be described.

Next, the third example of the S3 and S4 will be described. FIGS. 19 to 22 are diagrams illustrating the third example of the S3 and S4.

Figure 20:
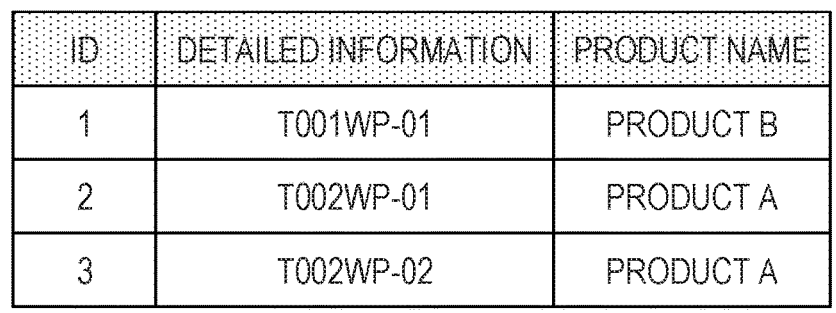
FIG. 20 is a diagram illustrating an example of temporary modification application information corresponding to the modification history illustrated in FIG. 19.

FIG. 19 is a diagram illustrating an example of the modification history 133 in a case where the entry with "ID" of "4" is lost from the information included in the modification history 133 illustrated in FIG. 10. FIG. 20 is a diagram illustrating an example of the temporary modification application information 132 corresponding to the modification history 133 illustrated in FIG. 19.

That is, in the modification history 133 illustrated in FIG. 10, the entry with "ID" of "4" is an entry indicating that a modification with "Detailed information" identified by "T003WP-01" is applied. Therefore, in comparison with the temporary modification application information 132 illustrated in FIG. 11, the temporary modification application information 132 illustrated in FIG. 20 does not include information indicating that the modification identified by "T003WP-01" is applied to the product C. Hereinafter, the third example of the S3 and S4 will be described with reference to FIGS. 19 and 22.

Figure 21:
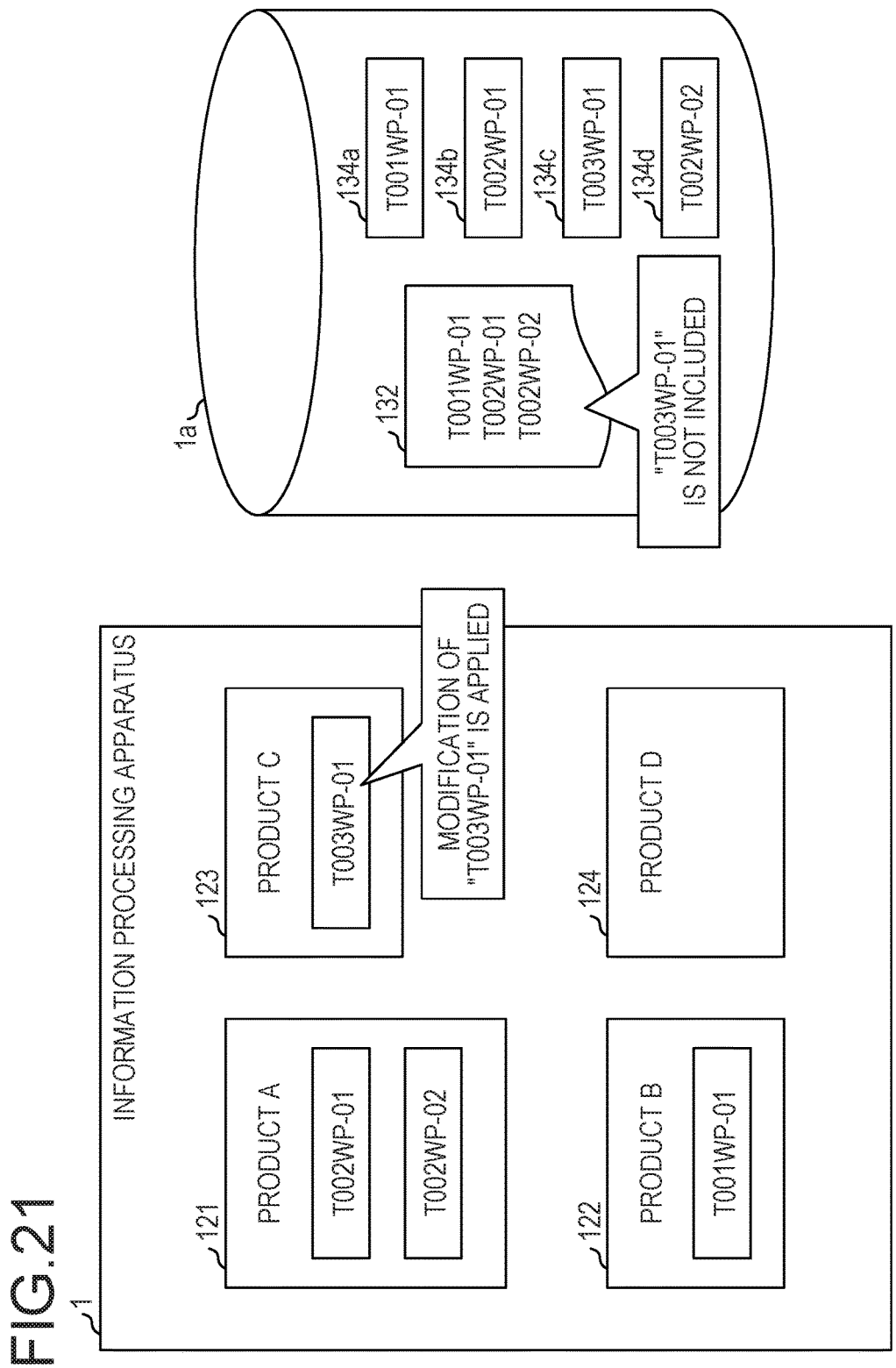
FIG. 21 is a diagram illustrating a third example of S3 and S4.
Figure 22:
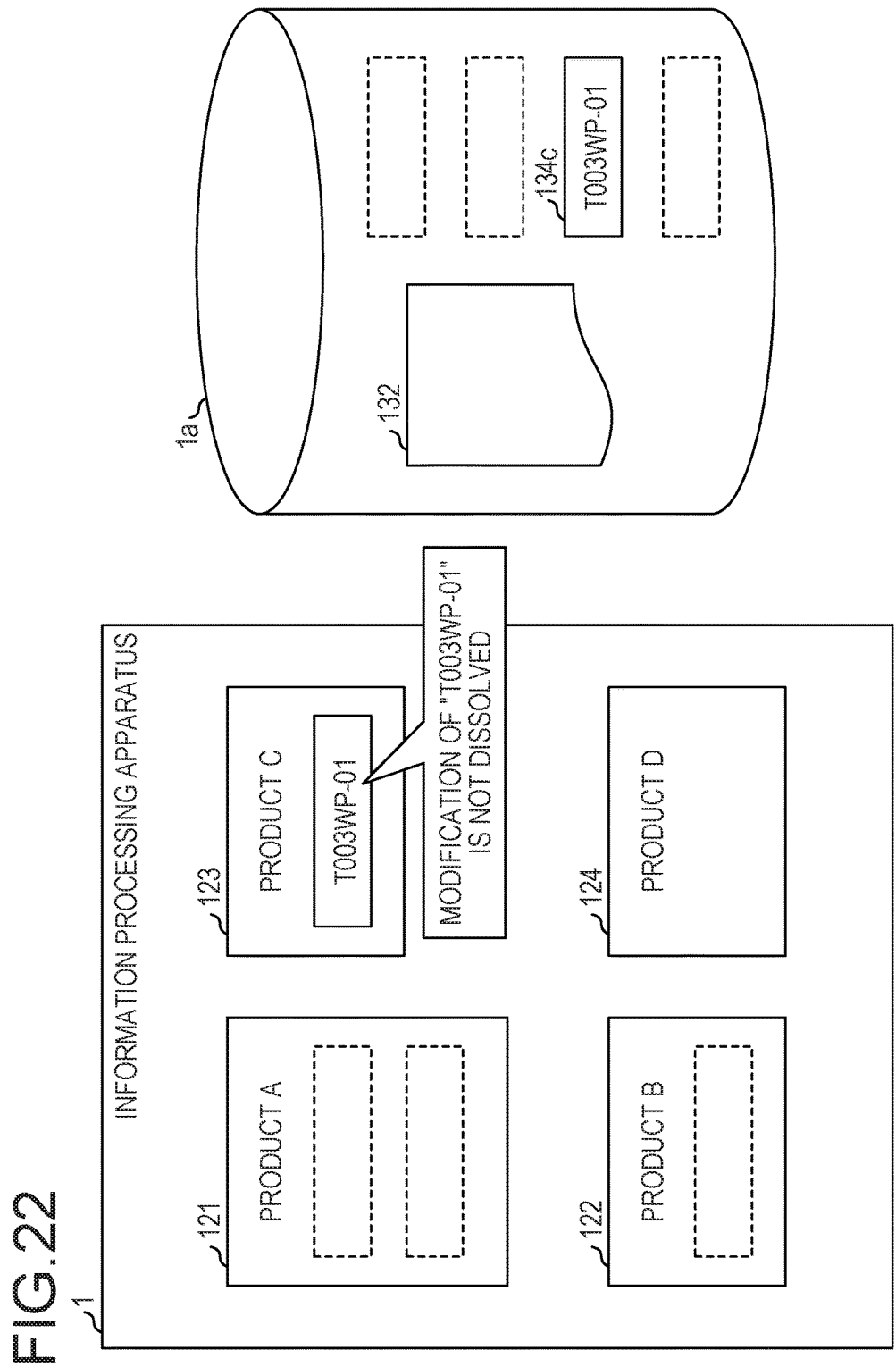
FIG. 22 is a diagram illustrating a third example of S3 and S4.

FIGS. 21 and 22 are diagrams illustrating the third example of the S3 and S4. In the example illustrated in FIG. 21, as in the example illustrated in FIG. 12 and so on, as service providing programs 120, a product A, a product B, a product C, and a product D are installed in the information processing apparatus 1. In the example illustrated in FIG. 21, modifications respectively identified by T002WP-01 and T002WP-02 are applied to the product A, a modification identified by T001WP-01 is applied to the product B, a modification identified by T003WP-01 is applied to the product C, and no modification is applied to the product D.

In the example illustrated in FIG. 21, the temporary modification application information 132 illustrated in FIG. 20 is stored in the storage unit 1a. That is, the temporary modification application information 132 illustrated in FIG. 21 includes only information indicating that modifications identified by T001WP-01, T002WP-01, and T002WP-02 are applied to one of the product A, the product B, the product C, and the product D.

In addition, in the example illustrated in FIG. 21, restoration information 134 corresponding to each of the modifications applied to the product A, the product B, the product C, and the product D is stored in the storage unit 1a. Specifically, restoration information 134a corresponding to T001WP-01, restoration information 134b corresponding to T002WP-01, restoration information 134c corresponding to T003WP-01, and restoration information 134d corresponding to T002WP-02 are stored in the storage unit is illustrated in FIG. 21.

In the example illustrated in FIG. 21, the restoration execution unit 113 dissolves the modifications presumed to be applied to the product A, the product B, the product C, and the product D by referring to the contents set in the temporary modification application information 132 (S11). Specifically, as illustrated in FIG. 22, the restoration execution unit 113 dissolves the modifications identified by T002WP-01 and T002WP-02 presumed to be applied to the product A, and the modification identified by T001WP-01 presumed to be applied to the product B.

Here, information on the modification identified by T003WP-01 is not included in the temporary modification application information 132 illustrated in FIG. 21. On the other hand, the restoration information 134c corresponding to T003WP-01 is stored in the storage unit is illustrated in FIG. 21.

Therefore, in the example illustrated in FIG. 22, the restoration execution unit 113 determines that there exists no modification for which the restoration information 134 is absent, among the first modifications ("NO" in S12). On the other hand, in the example illustrated in FIG. 22, the restoration execution unit 113 determines that there exists leftover restoration information 134 ("YES" in S13). Therefore, in the example illustrated in FIG. 22, the restoration execution unit 113 determines that the dissolution of modifications at S11 has been unsuccessfully performed (S14).

Thereafter, the modification execution unit 114 re-applies the modifications (identified by T001WP-01, T002WP-01, and T002WP-02) dissolved at S11 (S21). Hereinafter, a fourth example of the S3 and S4 will be described.

Figure 24:
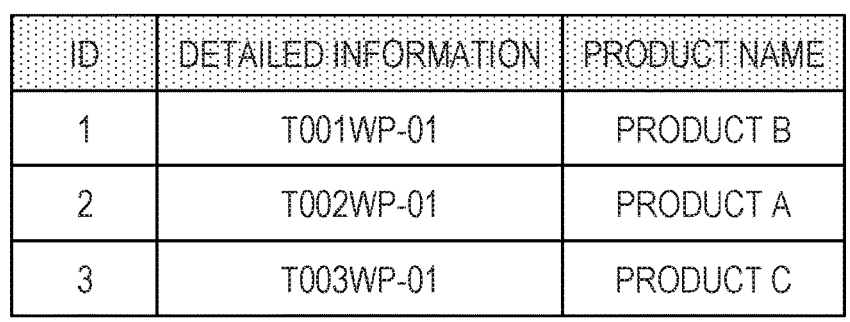
FIG. 24 is a diagram illustrating an example of temporary modification application information corresponding to the modification history illustrated in FIG. 23.

FIGS. 23 to 26 are diagrams illustrating the fourth example of the S3 and S4. FIG. 23 is a diagram illustrating an example of the modification history 133 in a case where information with "ID" of "7" is lost from the information included in the modification history 133 illustrated in FIG. 10. FIG. 24 is a diagram illustrating an example of the temporary modification application information 132 corresponding to the modification history 133 illustrated in FIG. 23.

That is, in the modification history 133 illustrated in FIG. 10, the information with "ID" of "7" is information indicating that a modification with "Detailed information" identified by "T002WP-02" is applied. Therefore, in comparison with the temporary modification application information 132 illustrated in FIG. 11, the temporary modification application information 132 illustrated in FIG. 24 does not include information indicating that the modification identified by "T002WP-02" is applied to the product A. Hereinafter, the fourth example of the S3 and S4 will be described with reference to FIGS. 23 and 26.

Figure 25:
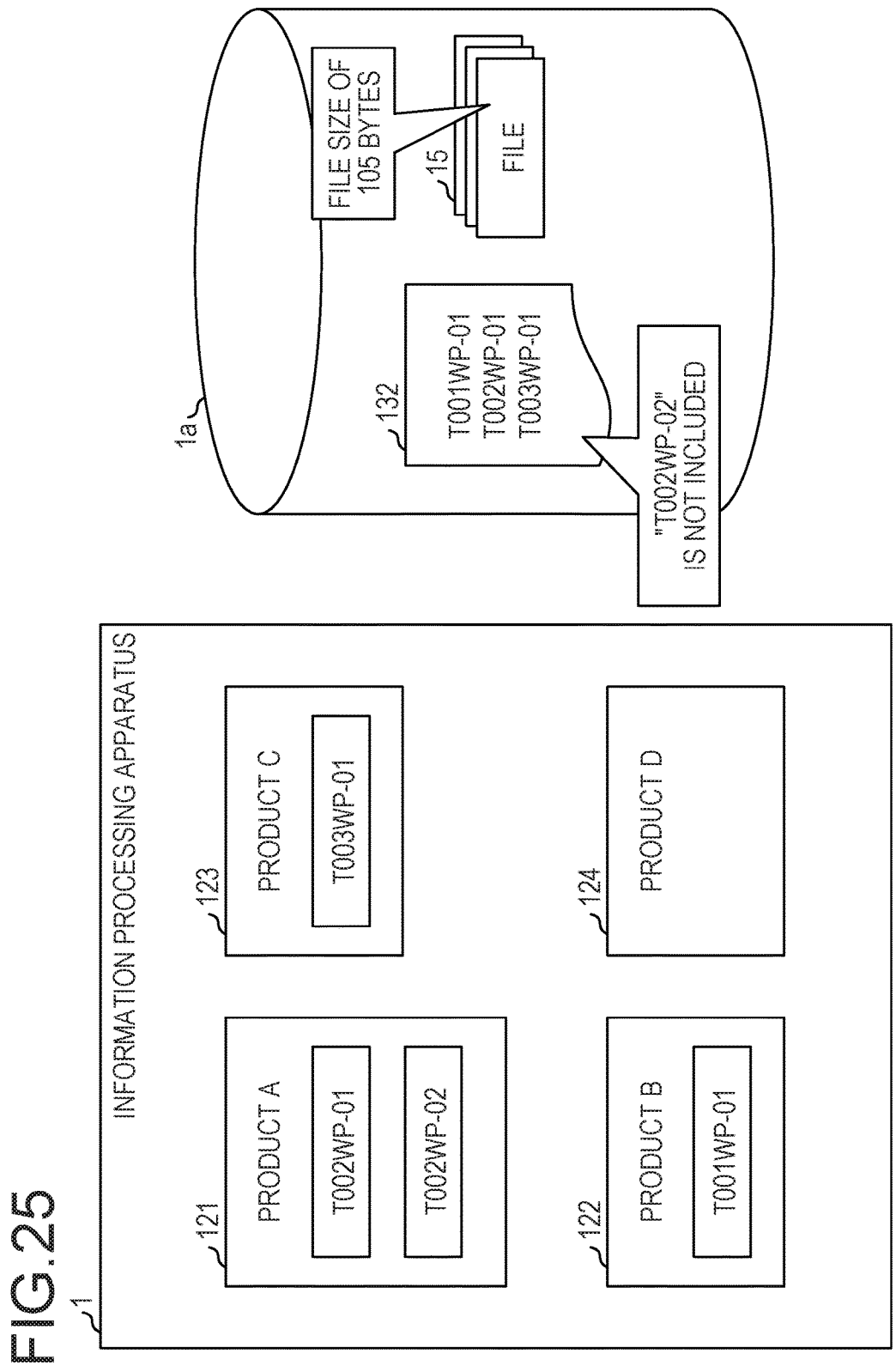
FIG. 25 is a diagram illustrating a fourth example of S3 and S4.

FIGS. 25 and 26 are diagrams illustrating the fourth example of the S3 and S4. In the example illustrated in FIG. 25, as in the example illustrated in FIG. 12 and so on, as service providing programs 120, a product A, a product B, a product C, and a product D are installed in the information processing apparatus 1. In the example illustrated in FIG. 25, modifications respectively identified by T002WP-01 and T002WP-02 are applied to the product A, and a modification identified by T001WP-01 is applied to the product B, a modification identified by T003WP-01 is applied to the product C, and no modification is applied to the product D.

In the example illustrated in FIG. 25, the temporary modification application information 132 illustrated in FIG. 24 is stored in the storage unit 1a. Specifically, the temporary modification application information 132 illustrated in FIG. 25 includes information indicating that modifications identified by T001WP-01, T002WP-01, and T003WP-01 are applied to one of the product A, the product B, the product C, and the product D.

In addition, in the example illustrated in FIG. 25, a file 15, which is updated when the modification identified by T002WP-01 and the modification identified by T002WP-02 are applied to the product A, is stored in the storage unit 1a. Hereinafter, it is assumed that the size of the file 15 before the modifications respectively identified by T002WP-01 and T002WP-02 are applied to the product A is 100 bytes. It is also assumed that the modification identified by T002WP-01 is applied to the product A only when the size of the file 15 is 100 bytes. It is further assumed that the modification identified by T002WP-02 is a modification to update the size of the file 15 from 100 bytes to 105 bytes. Specifically, in the example illustrated in FIG. 25, the product A is in a state where the modifications respectively identified by T002WP-01 and T002WP-02 have been already applied to the product A. Therefore, the size of the file 15 illustrated in FIG. 25 is 105 bytes.

The restoration information 134 illustrated in FIGS. 25 and 26 has identical contents as the restoration information 134 illustrated in FIG. 12 and so on and, therefore, description thereof is not repeated.

In the example illustrated in FIG. 25, the restoration execution unit 113 dissolves the modifications presumed to be applied to the product A, the product B, the product C, and the product D by referring to the contents set in the temporary modification application information 132 (S11). Specifically, as illustrated in FIG. 25, the restoration execution unit 113 dissolves the modification identified by T002WP-01 presumed to be applied to the product A. That is, for example, the restoration execution unit 113 restores the product A to a state before the modification identified by T001WP-01 is applied to the product A. The restoration execution unit 113 also dissolves the modification identified by T001WP-01 presumed to be applied to the product B and the modification identified by T003WP-01 presumed to be applied to the product C.

Thereafter, the restoration execution unit 113 updates the temporary modification application information 132 in response to the dissolution of the modifications applied to the product A, the product B, the product C, and the product D. Specifically, as illustrated in FIG. 26, the restoration execution unit 113 performs an update to delete information indicating T001WP-01, T002WP-01, and T003WP-01 from the temporary modification application information 132. In addition, in this case, the restoration execution unit 113 deletes the restoration information 134 corresponding to each modification.

Next, the modification execution unit 114 tries to re-apply the modifications (respectively identified by T001WP-01, T002WP-01, and T003WP-01) dissolved at S11 (S21).

However, in the example illustrated in FIGS. 25 and 26, the modification identified by T002WP-02 applied to the product A is not dissolved. That is, in the example illustrated in FIG. 26, the size of the file 15 is still 105 bytes, as illustrated in FIG. 25, not 100 bytes.

Therefore, in this case, although the product A has been restored to the state before the application of the modification identified by T002WP-01, the modification execution unit 114 does not apply the modification identified by T002WP-01 to the product A ("YES" in S22). Accordingly, in this case, the validity determination unit 115 determines that the re-application of modifications at S21 has been unsuccessfully performed (S23). Hereinafter, a first example of S5 will be described.

Figure 27:
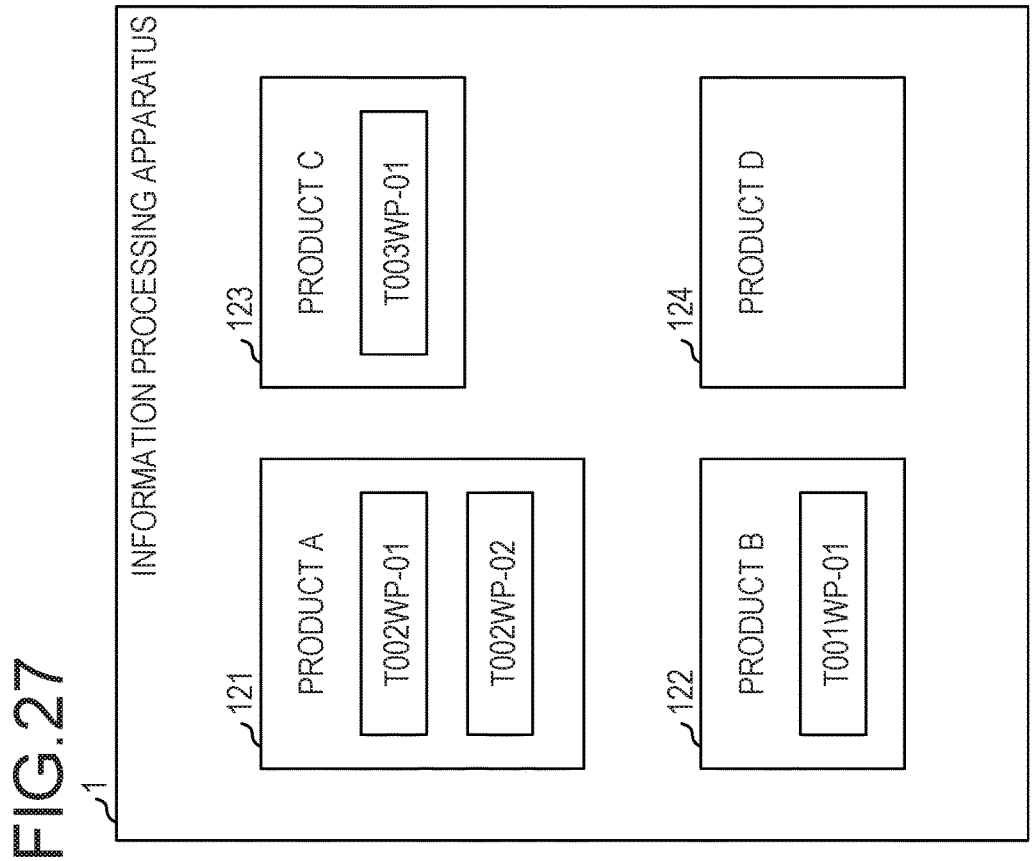
FIG. 27 is a diagram illustrating a fourth example of S3 and S4.

FIGS. 27 to 29 are diagrams illustrating the first example of S5. Hereinafter, the first example of S5 will be described with reference to the modification history 133 illustrated in FIG. 23, the temporary modification application information 132 illustrated in FIG. 24, and FIGS. 27 to 29.

In the example illustrated in FIG. 27, as in the example illustrated in FIG. 12 and so on, as service providing programs 120, a product A, a product B, a product C, and a product D are installed in the information processing apparatus 1. In the example illustrated in FIG. 27, modifications respectively identified by T002WP-01 and T002WP-02 are applied to the product A, and a modification identified by T001WP-01 is applied to the product B, a modification identified by T003WP-01 is applied to the product C, and no modification is applied to the product D.

In the example illustrated in FIG. 27, the temporary modification application information 132 illustrated in FIG. 24 is stored in the storage unit 1a. That is, the temporary modification application information 132 illustrated in FIG. 27 includes information indicating that modifications identified by T001WP-01, T002WP-01, and T003WP-01 are applied to one of the product A, the product B, the product C, and the product D.

In addition, in the example illustrated in FIG. 27, a module 16 which is substituted when a modification identified by T002WP-02 is applied to the product A is stored in the storage unit 1a. For example, the module 16 may act as a part of the product A. Hereinafter, it is assumed that a module M0 is stored as the module 16 in the storage unit is before the modifications respectively identified by T002WP-01 and T002WP-02 are applied to the product A. It is also assumed that a module M1 is stored as the module 16 in the storage unit is when the modification identified by T002WP-01 is applied to the product A. It is further assumed that a module M2 is stored as the module 16 in the storage unit is when the modification identified by T002WP-02 is applied to the product A.

In the example illustrated in FIG. 27, the restoration execution unit 113 dissolves the modifications presumed to be applied to the product A, the product B, the product C, and the product D by referring to the contents set in the temporary modification application information 132 (S11). Specifically, as illustrated in FIG. 28, the restoration execution unit 113 dissolves the modification identified by T002WP-01 presumed to be applied to the product A, the modification identified by T001WP-01 presumed to be applied to the product B, and the modification identified by T003WP-01 presumed to be applied to the product C. In addition, in this case, the restoration execution unit 113 deletes the restoration information 134 corresponding to each modification.

Here, the restoration execution unit 113 dissolves the modification identified by T002WP-01, for example, by substituting the module 16 with the module M0. That is, in this case, the restoration execution unit 113 dissolves the modification irrespective of whether or not the module 16 is the module M1 before the dissolution of the modification.

Thereafter, the restoration execution unit 113 updates the temporary modification application information 132 according to the dissolution of modifications applied to the product A, the product B, the product C, and the product D. Specifically, as illustrated in FIG. 28, the restoration execution unit 113 performs an update to delete information indicating T001WP-01, T002WP-01, and T003WP-01 from the temporary modification application information 132.

Next, as illustrated in FIG. 29, the modification execution unit 114 re-applies the modifications (respectively identified by T001WP-01, T002WP-01, and T003WP-01) dissolved at S11 (S21). Specifically, in the example illustrated in FIG. 29, the modification execution unit 114 substitutes the module 16 with the module M1.

That is, in the example illustrated in FIG. 29, the modification execution unit 114 may successfully applies the modification identified by T002WP-01. Therefore, in the example illustrated in FIG. 29, the validity determination unit 115 determines that the re-application of modifications at S21 has been successfully performed ("NO" in S22, and then S24).

However, the module 16 is substituted with the module M1 in the example of FIG. 29, whereas the module 16 is substituted with the module M2 in the example of FIG. 27. Therefore, the validity determination unit 115 determines that the status of the business system before S3 is performed is different from the status of the business system after S4 is performed ("NO" in S32). Accordingly, the validity determination unit 115 determines that the temporary modification application information 132 is invalid (S34).

Thus, even when it is determined that the dissolution of modifications at S3 and the re-application of modifications at S4 have been successfully performed ("YES" in S31), the validity determination unit 115 may make further determination on the validity of the temporary modification application information 132.

The validity determination unit 115 may make the comparison between the status of the business system before S3 is performed and the status of the business system after S4 is performed, for example, through a comparison between sizes of the module 16.

Before performing the information creation, the information processing apparatus 1 may replicate the business system operating in the information processing apparatus 1 to another physical machine (or another virtual machine). In this case, the information processing apparatus 1 may perform the information creation for only one business system. Accordingly, the validity determination unit 115 may perform S32 by comparing the status of the business system for which the information creation is performed with the status of the business system for which the information creation is not performed.

In this way, according to the embodiment, on the basis of the version number information of the service providing program 120 executed in a business system to be managed, which is included in the modification history 133 of the service providing program 120 executed in the business system, the information processing apparatus 1 creates the temporary modification application information 132 which is the information on the first modification applied to the service providing program 120. Then, on the basis of the created temporary modification application information 132, the information processing apparatus 1 restores the service providing program 120 to a state before the application of the first modification and then re-applies the first modification to the restored service providing program 120. Thereafter, on the basis of the information on the progress or results of the dissolution and re-application of the first modification applied to the service providing program 120, the information processing apparatus 1 determines the validity of the temporary modification application information 132.

Accordingly, the information processing apparatus 1 may create the modification application information 131 with high validity without performing a task such as re-installation of the service providing program 120.

Depending on processing characteristics or the like of the service providing program 120, the information processing apparatus 1 may perform only some of the S12, S13, S22, and S32 in the embodiment. Specifically, for example, when the validity of the temporary modification application information 132 may be determined by performing only S32, the information processing apparatus 1 may perform only S32 without performing the S12, S13, and S22.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A non-transitory computer-readable recording medium storing a program that causes a computer to execute a process, the process comprising:

detecting whether modification application information of software stored in an information storage area is deleted, the modification application information being information on first modifications previously applied to the software;

creating, when the modification application information of the software is deleted, temporary modification application information on second modifications expected to be currently applied to the software, based on version number information contained in a modification history of the software executed in a system, the version number information including version numbers of the first modifications previously applied to the software;

restoring the software to a state before the second modifications are applied using the temporary modification application information created by said creating as a reference;

upon said restoring of the software, re-applying the second modifications to the restored software based on the temporary modification application information; and determining whether the temporary modification application information created by said creating is valid based on whether said restoring of the software and said re-applying of the second modifications are successfully performed depending on a difference between the first modifications and the second modifications, thereby acquiring the temporary modification application information instead of the modification application information without re-installing the software.

2. The non-transitory computer-readable recording medium according to claim 1, the process comprising:

determining that the temporary modification application information is invalid when the restoration of the software or the re-application of the second modifications is unsuccessfully performed; and determining that the temporary modification application information is valid when the restoration of the software and the re-application of the second modifications are successfully performed.

3. The non-transitory computer-readable recording medium according to claim 1, the process comprising:

determining, when the restoration of the software and the re-application of the second modifications are successfully performed, whether a first status is different from a second status, the first status being a status of the system before the software is restored, the second status being a status of the system after the second modifications are re-applied;

determining that the temporary modification application information is invalid when it is determined that the first status is different from the second status; and determining that the temporary modification application information is valid when it is determined that the first status is not different from the second status.

4. The non-transitory computer-readable recording medium according to claim 3, wherein the first status and the second status include a status of a size of a file accessed by the system.

5. The non-transitory computer-readable recording medium according to claim 1, the process comprising:

determining whether a third modification exists in the second modifications, the third modification being a modification for which restoration information is absent when the software is restored, the restoration information being an execution file for restoring the software; and determining that the restoration of the software and the re-application of the second modifications are unsuccessfully performed when it is determined that the third modification exists.

6. The non-transitory computer-readable recording medium according to claim 1, the process comprising:

determining whether a leftover execution file exists in restoration information, the leftover execution file being an execution file which has not been used in the restoration of the software, the restoration information being information to be used in the restoration of the software; and determining that the restoration of the software and the re-application of the second modifications are unsuccessfully performed when it is determined that the leftover execution file exists.

7. The non-transitory computer-readable recording medium according to claim 1, wherein when it is determined that the temporary modification application information created at the creating is not valid, updating the temporary modification application information according to the results on whether the restoring of the software and the re-applying of the second modifications are successfully performed.

8. An apparatus for creating modification application information, the apparatus comprising:

a memory; and a processor coupled with the memory and configured to
detect whether modification application information of software stored in the memory is deleted, the modification application information being information on first modifications previously applied to the software, create, when the modification application information of the software is deleted, based on version number information contained in a modification history of software executed in a system, temporary modification application information on second modifications expected to be currently applied to the software, the version number information including version numbers of the first modifications previously applied to the software, restore the software to a state before the second modifications are applied using the temporary modification application information as a reference, upon restoring the software, re-apply the second modifications to the restored software based on the temporary modification application information, and determine whether the temporary modification application information is valid based on whether the restoring of the software and re-applying of the second modifications are successfully performed depending on a difference between the first modifications and the second modifications, thereby acquiring the temporary modification application information instead of the modification application information without re-installing the software.

9. The apparatus according to claim 8, wherein the processor is configured to determine that the temporary modification application information is invalid when the restoration of the software or the re-application of the second modifications is unsuccessfully performed, and determine that the temporary modification application information is valid when the restoration of the software and the re-application of the second modifications are successfully performed.

10. The apparatus according to claim 8, wherein the processor is configured to determine, when the restoration of the software and the re-application of the second modifications are successfully performed, whether a first status is different from a second status, the first status being a status of the system before the software is restored, the second status being a status of the system after the second modifications are re-applied, determine that the temporary modification application information is invalid when it is determined that the first status is different from the second status, and determine that the temporary modification application information is valid when it is determined that the first status is not different from the second status.

11. The apparatus according to claim 8, wherein when it is determined that the temporary modification application information created at the creating is not valid, updating the temporary modification application information according to the results on whether the restoring of the software and the re-applying of the second modifications are successfully performed.

12. A method for creating modification application information, the method comprising:

detecting whether modification application information of software stored in an information storage area is deleted;

creating, when the modification application information of the software is deleted, temporary modification application information as temporary modification application information on second modifications expected to be currently applied to the software, based on version number information contained in a modification history of the software executed in a system, the version number information including version numbers of the first modifications previously applied to the software;

restoring the software to a state before the second modifications are applied using the temporary modification application information created by said creating as a reference;

upon said restoring of the software, re-applying the second modifications to the restored software based on the temporary modification application information; and determining whether the temporary modification application information created by said creating is valid based on whether said restoring of the software and said re-applying of the second modifications are successfully performed depending on a difference between the first modifications and the second modifications, thereby acquiring the temporary modification application information instead of the modification application information without re-installinq the software.

13. The method according to claim 12, comprising:

determining that the temporary modification application information is invalid when the restoration of the software or the re-application of the second modifications is unsuccessfully performed; and determining that the temporary modification application information is valid when the restoration of the software and the re-application of the second modifications are successfully performed.

14. The method according to claim 12, comprising:

determining, when the restoration of the software and the re-application of the second modifications are successfully performed, whether a first status is different from a second status, the first status being a status of the system before the software is restored, the second status being a status of the system after the second modifications are re-applied;

determining that the temporary modification application information is invalid when it is determined that the first status is different from the second status; and determining that the temporary modification application information is valid when it is determined that the first status is not different from the second status.

15. The method according to claim 12, wherein when it is determined that the temporary modification application information created at the creating is not valid, updating the temporary modification application information according to the results on whether the restoring of the software and the re-applying of the second modifications are successfully performed.

* * * * *